United States Patent
Minami

(10) Patent No.: US 8,337,363 B2
(45) Date of Patent: Dec. 25, 2012

(54) GEAR CHANGE CONTROL DEVICE, STRADDLE-TYPE VEHICLE, AND GEAR CHANGE CONTROL METHOD

(75) Inventor: Kengo Minami, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 811 days.

(21) Appl. No.: 12/418,440

(22) Filed: Apr. 3, 2009

(65) Prior Publication Data

US 2009/0270224 A1    Oct. 29, 2009

(30) Foreign Application Priority Data

Apr. 25, 2008   (JP) .................. 2008-116412

(51) Int. Cl.
   *B60W 10/02*   (2006.01)
(52) U.S. Cl. .......................... 477/180; 477/79
(58) Field of Classification Search .......... 477/70, 477/79, 115, 166, 174, 180
See application file for complete search history.

(56) References Cited

U.S. PATENT DOCUMENTS

| 2003/0054920 A1* | 3/2003 | Berger et al. ................ 477/70 |
| 2004/0192504 A1* | 9/2004 | Kumazawa ................ 477/166 |
| 2007/0240955 A1 | 10/2007 | Zenno |
| 2008/0207393 A1 | 8/2008 | Minami |
| 2008/0208423 A1 | 8/2008 | Minami |

FOREIGN PATENT DOCUMENTS

| EP | 1826087 | 8/2007 |
| JP | 2001-173685 | 6/2001 |

OTHER PUBLICATIONS

European Search Report, Aug. 28, 2009, for European Patent App. No. 09 25 1144.

* cited by examiner

*Primary Examiner* — Justin Holmes
(74) *Attorney, Agent, or Firm* — Keating & Bennett, LLP

(57) ABSTRACT

A gear change control device actuates an actuator in response to an input of a gear change command and sets the clutch in an intermediate state between the engaged and disengaged states before a plurality of gears in the transmission are selectively engaged by dog clutches. In the intermediate state, a driving-side friction member and a driven-side friction member of the clutch are pressed against each other at a pressure lower than in the engaged state. The gear change control device actuates the clutch actuator to restore the friction clutch set in the intermediate state to the engaged state after the plurality of gears are selectively engaged.

28 Claims, 12 Drawing Sheets

GEAR CHANGE CONTROL DEVICE, STRADDLE-TYPE VEHICLE, AND GEAR CHANGE CONTROL METHOD

PRIORITY INFORMATION

This patent application is based on and claims priority under 35 U.S.C. §119 to Japanese Patent Application No. 2008-116412, filed on Apr. 25, 2008, the entire contents of which is hereby expressly incorporated by reference.

TECHNICAL FIELD

The present invention relates to a technique for improving the acceleration performance of a vehicle at the time of a gear change in a gear change control device, straddle-type vehicle and gear change control method where a clutch is controlled by an actuator.

BACKGROUND

A semiautomatic vehicle in which a clutch provided in the torque transmission path from the engine to the wheels is operated by an actuator and, in addition to the operation of the clutch, a transmission disposed downstream of the clutch is operated by an actuator is conventionally known. See, for example, Japanese Patent Application Publication No. 2001-173685 (JP-A-2001-173685).

Some straddle-type vehicles, such as motorcycles, have a friction clutch including a driving-side friction member (e.g., a friction disc) and a driven-side friction member (e.g., a clutch disc), and a constant-mesh transmission including a plurality of gears which are relatively movable axially. In the constant-mesh transmission, dog clutches are formed on the gears and the plurality of gears are selectively moved at the time of gear change and the combination of gears that are engaged with each other by their dog clutches is changed to change the gears used to transmit torque.

In the semiautomatic vehicle having such transmission and clutch, when the rider operates a shift button or shift pedal to command a gear change, the actuator first disengages the clutch to interrupt the transmission of torque to the transmission and then displacement of the gears is started. After the displacement of the gears is completed and the gears are engaged in a combination in accordance with the gear change command, the actuator starts engagement of the clutch, that is, a control operation to shift the clutch from the disengaged state to the engaged state. In this control operation, the clutch is typically controlled to shift to the engaged state gradually, and transmission of torque by the clutch and the transmission starts when pressure is generated between a driving-side friction member and a driven-side friction member.

In the above-described conventional control operation, however, since the clutch is temporarily shifted to a disengaged state, it takes time until the transmission of torque to the wheel starts after the start of engagement of the clutch, resulting in insufficient acceleration performance at the time of gear change.

In this respect, a control operation in which the clutch is engaged before the displacement of the gears is completed, that is, before two gears are engaged with each other by their dog clutches and a control operation in which the gears are displaced and engaged with the clutch kept engaged are contemplated. According to such control operations, torque is transmitted to the wheels via the clutch and the transmission upon engagement of the two gears by their dog clutches. For example, the engine output is reduced to reduce the torque to the transmission with the clutch kept engaged when a gear change command is given, and then displacement of the gears is started. Then, the gears are engaged in a new combination with the clutch still engaged. According to such a control operation, however, the acceleration performance at the time of gear change can be improved but a shock may occur and the ride quality of the vehicle at the time of gear change may be impaired because excessive torque is transmitted to the wheel when the gears are engaged by their dog clutches.

SUMMARY

The present invention has been made in view of the above problem, and it is, therefore, an object of the present invention to provide a gear change control device, a straddle-type vehicle and a gear change control method which can improve acceleration performance and prevent degradation of the ride quality at the time of gear change.

A gear change control device to solve the above problem according to the present invention is a gear change control device for a straddle-type vehicle including a friction clutch including a driving-side friction member and a driven-side friction member which are pressed against each other to transmit torque in an engaged state and which are released from the pressure to interrupt transmission of torque in a disengaged state, and a transmission which includes a plurality of gears each having a dog clutch and in which the plurality of gears are selectively displaced relative to each other and are selectively engaged by the dog clutches at the time of gear change to transmit torque at a new transmission ratio, and further including a clutch actuator for operating the friction clutch. The gear change control device also includes a clutch shift control module for actuating the clutch actuator in response to an input of a gear change command and shifts the friction clutch to an intermediate state in which the driving-side friction member and the driven-side friction member are pressed against each other at a pressure lower than in the engaged state before the plurality of gears are selectively engaged by the dog clutches, and a clutch restoration control module for actuating the clutch actuator to restore the friction clutch set in the intermediate state to the engaged state after the plurality of gears are selectively engaged by the dog clutches.

A straddle-type vehicle according to the present invention to solve the above problem is equipped with the gear change control device described above.

A gear change control method to solve the above problem according to the present invention is a gear change control method for a straddle-type vehicle including a friction clutch including a driving-side friction member and a driven-side friction member which are pressed against each other to transmit torque in an engaged state and which are released from the pressure to interrupt transmission of torque in a disengaged state, a clutch actuator for operating the friction clutch, and a transmission which includes a plurality of gears each having a dog clutch and in which the plurality of gears are selectively displaced relative to each other and are selectively engaged by the dog clutches at the time of gear change to transmit torque at a new transmission ratio. The gear change control method includes a step of actuating the clutch actuator in response to an input of a gear change command to set the friction clutch in an intermediate state in which the driving-side friction member and the driven-side friction member are pressed against each other at a pressure lower than in the engaged state before the plurality of gears are selectively engaged by the dog clutches, and a step of actuating the clutch actuator to restore the friction clutch set in the intermediate state to the engaged state after the plurality of gears are selectively engaged by the dog clutches.

Therefore, since torque starts to be transmitted to the wheel via the friction clutch and the transmission when the gears of the transmission are selectively engaged by the dog clutches, the time during which transmission of torque to the wheel is interrupted is shortened and the acceleration performance at the time of gear change can be improved. Also, since the pressure exerted between the driving-side friction member and the driven-side friction member in the intermediate state is lower than in the engaged state, it is possible to prevent shock from occurring when the gears of the transmission are engaged by the dog clutches.

DETAILED DESCRIPTION

Figure 1:
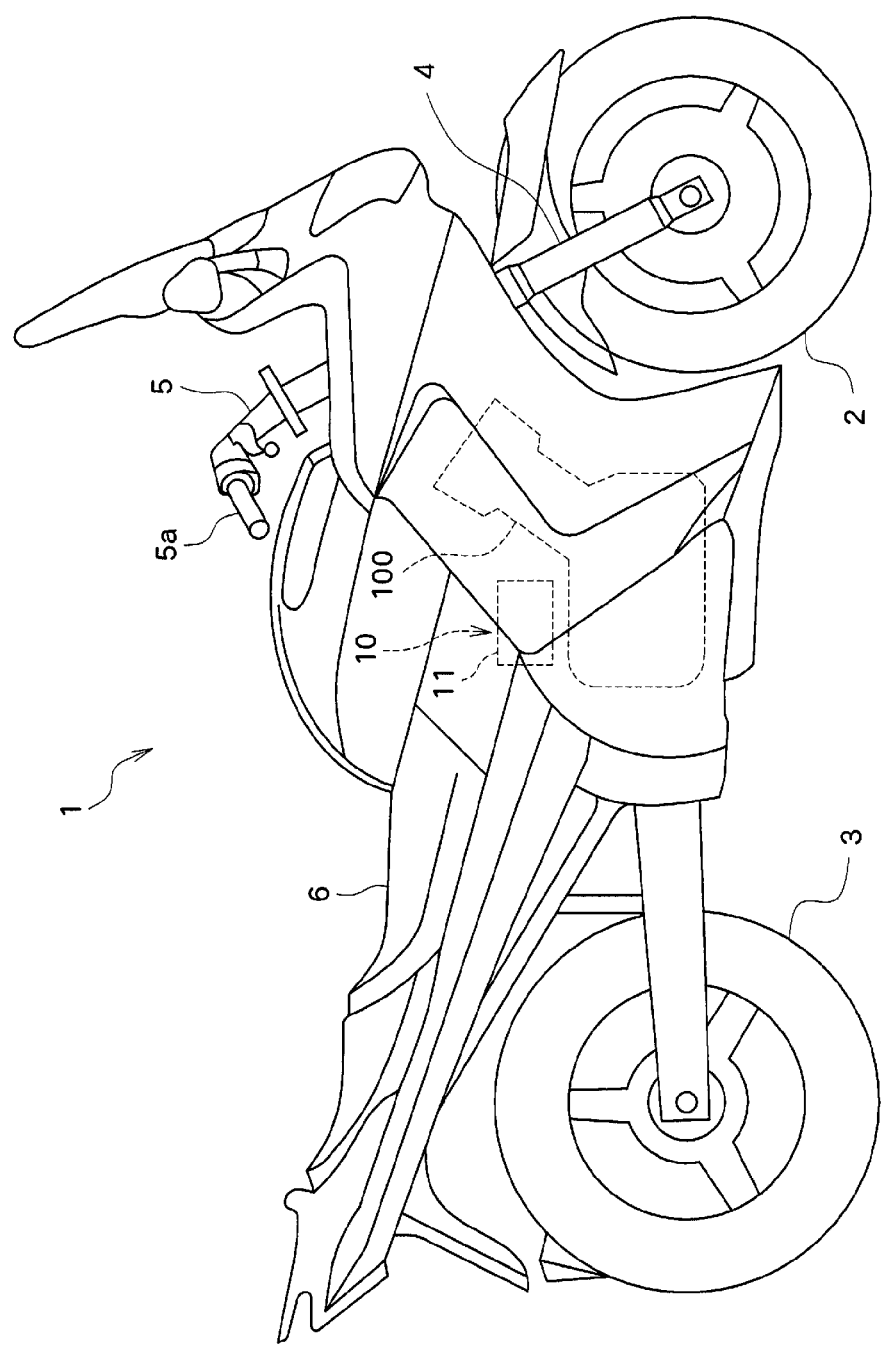
FIG. 1 is side view of a motorcycle equipped with a gear change control device according to one embodiment of the present invention.
Figure 2:
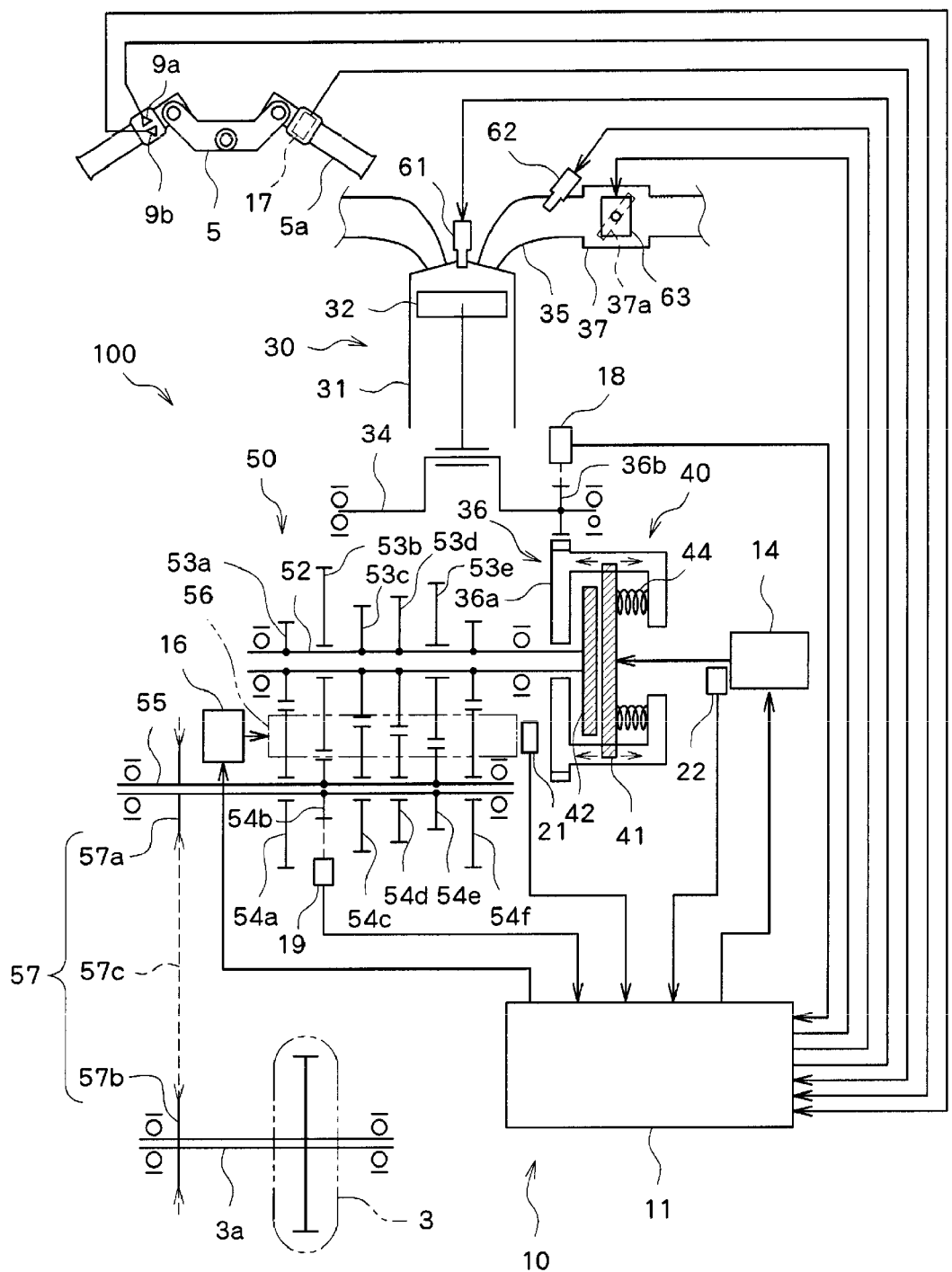
FIG. 2 is a schematic view of the mechanism provided in the torque transmission path in the motorcycle and the gear change control device.

One embodiment of the present invention is described hereinafter with reference to the appended drawings. FIG. 1 is a side view of a motorcycle 1 equipped with a gear change control device 10 as an example of the embodiment of the present invention. FIG. 2 is a schematic view of a mechanism provided in the torque transmission path in the motorcycle 1 and the gear change control device 10.

As shown in FIG. 1, the motorcycle 1 has an engine unit 100, a front wheel 2, and a rear wheel 3 in addition to the gear change control device 10. The front wheel 2 is located in front of the vehicle body and supported by a front fork 4. A handle bar 5 is disposed on top of the front fork 4, and the front wheel 2 and the handle bar 5 are rotatable together by the rider's steering operation. A throttle grip 5a which is rotatable by the rider's throttle operation is provided at one end of the handle bar 5. A seat 6 for the rider to sit astride is located behind the handle bar 5, and the engine unit 100 is located below the seat 6.

As shown in FIG. 2, the engine unit 100 includes an engine 30, a primary speed reduction mechanism 36, a friction clutch 40, and a transmission 50. The engine 30 has a cylinder 31, a piston 32, and a crankshaft 34.

A throttle body 37, which is provided therein with a throttle valve 37a, is connected to the cylinder 31. The throttle valve 37a is electronically controlled, and a valve actuator 63, which is attached to the throttle body 37, opens and closes the throttle valve 37a. An injector 62, serving as a fuel supply device, is operatively attached to an intake passage 35 provided between the cylinder 31 and the throttle body 37. The cylinder 31 has a spark plug 61, and the spark plug 61 ignites a mixture of air and fuel drawn through the intake passage 35. The piston 32 undergoes a reciprocating motion within the cylinder 31 by combustion of the air-fuel mixture. The crankshaft 34, which is connected to the piston 32, receives the reciprocating motion of the piston 32 and rotates accordingly. It should be noted that although the throttle valve 37a is described as an electronically controlled valve in this description, the throttle valve 37a may be connected to the throttle grip 5a by, for example, a wire and may be opened and closed in response to operation of the throttle grip 5a. A carburetor may be provided as a fuel supply device instead of the injector 62.

The primary speed reduction mechanism 36 has a driving-side primary gear 36a, which is rotatable together with the crankshaft 34, and a driven-side primary gear 36b in meshing engagement with the primary gear 36a, and reduces the rotation of the crankshaft 34 by the gear ratio therebetween.

The friction clutch 40 (which is hereinafter referred to simply as "clutch") may be a multi-plate friction clutch or a single-plate friction clutch, for example, and has a driving-side friction member 41 (e.g., a friction disc) rotatable together with the driven-side primary gear 36b, and a driven-side friction member 42 (e.g., a clutch disc) rotatable together with a main shaft 52. When the clutch 40 is in an engaged state, the driving-side friction member 41 and the driven-side friction member 42 are pressed against each other by a clutch spring 44, and the frictional force therebetween causes them to rotate together. Then, the torque of the engine 30 is transmitted from the driving-side friction member 41 to the main shaft 52 via the driven-side friction member 42. When the clutch 40 is in a disengaged state, the driving-side friction member 41 and the driven-side friction member 42 are separated from each other against the elastic (biasing) force of the clutch spring 44, and the pressure between the driving-side friction member 41 and the driven-side friction member 42 is released. Then, the driven-side friction member 42 idles relative to the driving-side friction member 41 and transmission of torque is interrupted. As described later, the gear change control device 10 has a clutch actuator 14, and the operation to shift the clutch 40 from the engaged state to the disengaged side and the operation to restore the clutch 40 to the engaged state are executed by the clutch actuator 14.

It should be noted that although the friction clutch 40, in which the driving-side friction member 41 and the driven-side friction member 42 are pressed against each other by the clutch spring 44, is described as an example, the driving-side friction member 41 and the driven-side friction member 42 may be pressed against each other by hydraulic pressure, in which case the clutch actuator 14 shifts the clutch 40 to the disengaged side by reducing the hydraulic pressure.

Figure 3:
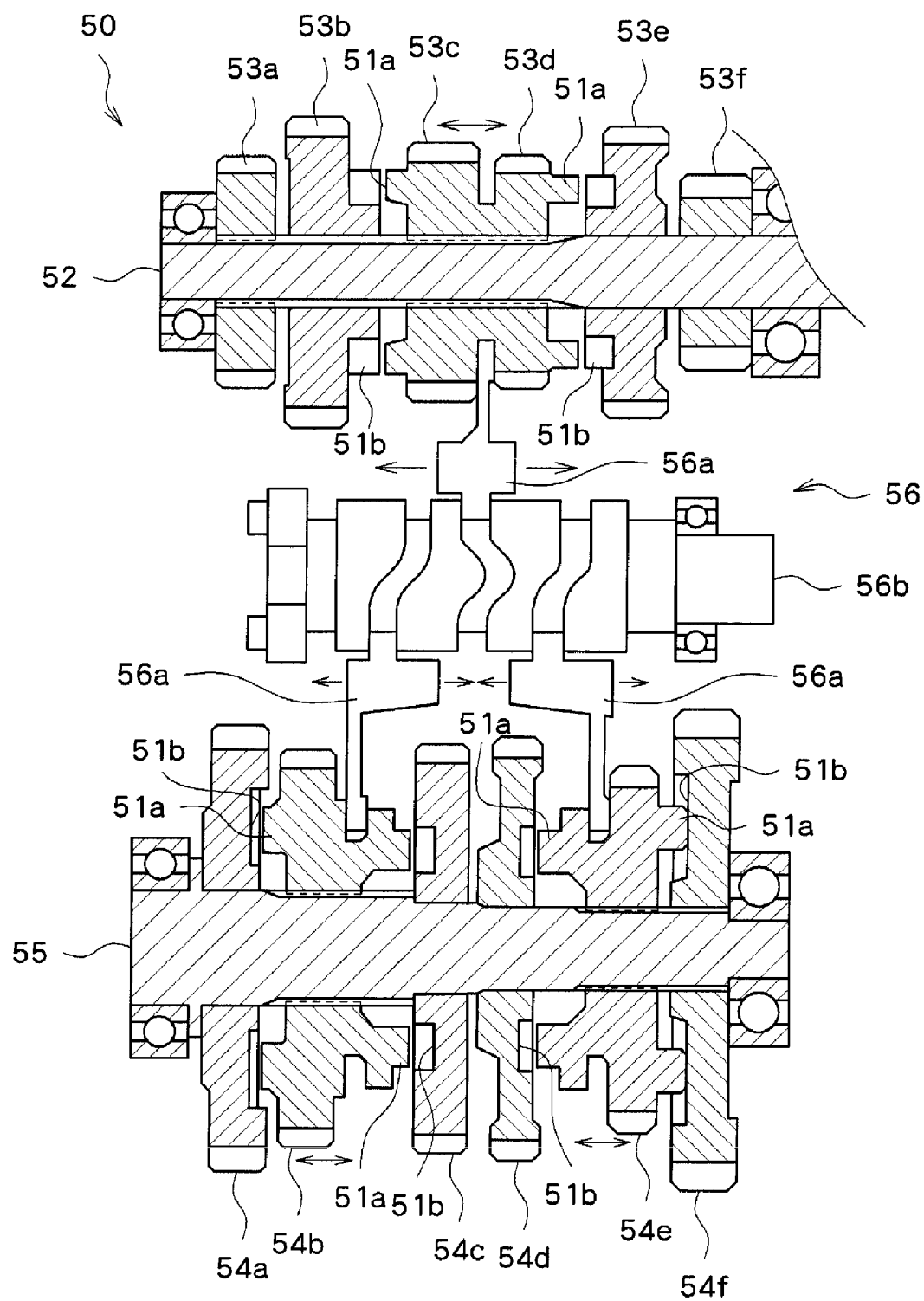
FIG. 3 is a schematic view of a transmission of the motorcycle.

The transmission 50 is next described. FIG. 3 is a schematic view of the transmission 50. The transmission 50 is a constant-mesh transmission, and has a plurality (six, herein) of speed-change gears 53a, 53b, 53c, 53d, 53e and 53f mounted on the main shaft 52, and a plurality of speed-change gears 54a, 54b, 54c, 54d, 54e and 54f mounted on an output shaft 55 and in meshing engagement with the speed-change gears 53a, 53b, 53c, 53d, 53e and 53f on the main shaft 52, respectively. One of each pair of gears that are in meshing engagement with each other is mounted for idle rotation about the respective shaft. In the example described here, the speed-change gears 53b, 53e, 54a, 54c, 54d and 54f are mounted for idle rotation about the main shaft 52 or the output shaft 55, respectively, and the speed-change gears 54b, 54e, 53a, 53c, 53d and 53f in meshing engagement therewith respectively are mounted on the main shaft 52 or the output shaft 55, respectively, for rotation together therewith. It should be noted that the speed-change gears 53a, 53b, 53c, 53d, 53e and 53f and the speed-change gears 54a, 54b, 54c, 54d, 54e and 54f are shown separated in FIG. 3 for simplification.

The transmission 50 is a dog clutch type. The speed-change gears 53c, 53d, 54b and 54e are provided for axial movement, and a dog clutch 51a including axially protruding protrusions is formed on each of the speed-change gears 53c, 53d, 54b and 54e. Each of the speed-change gears 53b, 53e, 54a, 54c, 54d and 54f axially facing the speed-change gears 53c, 53d, 54b and 54e has a dog clutch 51b having recesses with which a corresponding dog clutch 51a is engageable. Each of the speed-change gears 53c, 53d, 54b and 54e is movable between an engaged position where it is engaged with an adjacent speed-change gear 53b, 53e, 54a, 54c, 54d or 54f, respectively, by their dog clutches 51a and 51b and a disengaged position where it is not engaged with the respective adjacent speed-change gear.

In changing gears, a speed-change gear corresponding to the gear step newly set by a gear change command (which is hereinafter referred to as "new-gear-step movable gear") is moved to its engaged position, and the new-gear-step movable gear and its adjacent speed-change gear (which is hereinafter referred to as "new-gear-step stationary gear") are engaged with each other by their dog clutches 51a and 51b. The other speed-change gears are returned to their disengaged positions. That is, in changing gears, the speed-change gear 53c, 53d, 54b or 54e is selectively moved to its engaged position and engaged with the corresponding speed-change gear 53b, 53e, 54a, 54c, 54d or 54f according to the gear change command (to shift from first gear to second gear, from fourth gear to third gear, etc.). Also, the speed-change gear which has been in its engaged position in the gear step before the input of the gear change command is returned to its disengaged position. As a result, the gears through which the torque of the engine 30 is transmitted to the rear wheel 3 side are changed. For example, when the speed-change gear 53c is in its engaged position in the gear step before the input of the gear change command, the rotation of the main shaft 52 is transmitted to the output shaft 55 via the speed-change gears 53c, 53b and 54b. Then, when a gear change command is inputted, the speed-change gear 53d, for example, is moved to its engaged position, and the rotation of the main shaft 52 is transmitted to the output shaft 55 via the speed-change gears 53d, 53e and 54e.

The transmission 50 has a gear switching mechanism 56 for displacing the speed-change gears 53c, 53d, 54b and 54e. In the example shown in FIG. 3, the gear switching mechanism 56 has a plurality of shift forks 56a engaged with the speed-change gears 53c, 53d, 54b and 54e, and a shift cam 56b which moves the shift forks 56a axially when rotated. As described later, the gear change control device 10 has a shift actuator 16, and the shift actuator 16 rotates the shift cam 56b in response to an input of a gear change command to move a new-gear-step movable gear together with the shift forks 56a (see FIG. 2). The above is the description of the transmission 50.

As shown in FIG. 2, a transmission mechanism 57 is a mechanism which reduces the rotation of the output shaft 55 and transmits the rotation to an axle 3a of the rear wheel 3. For example, the transmission mechanism 57 includes a driving-side member (such as a driving-side sprocket) 57a operatively connected to the output shaft 55, a driven-side member (such as a driven-side sprocket) 57b operatively connected to the axle 3a, and a transmitting member (such as a chain, belt or shaft) 57c for transmitting torque from the driving-side member 57a to the driven-side member 57b.

The torque outputted from the engine 30 is transmitted to the axle 3a of the rear wheel 3 via the primary speed reduction mechanism 36, the clutch 40, the transmission 50, and the transmission mechanism 57.

Figure 4:
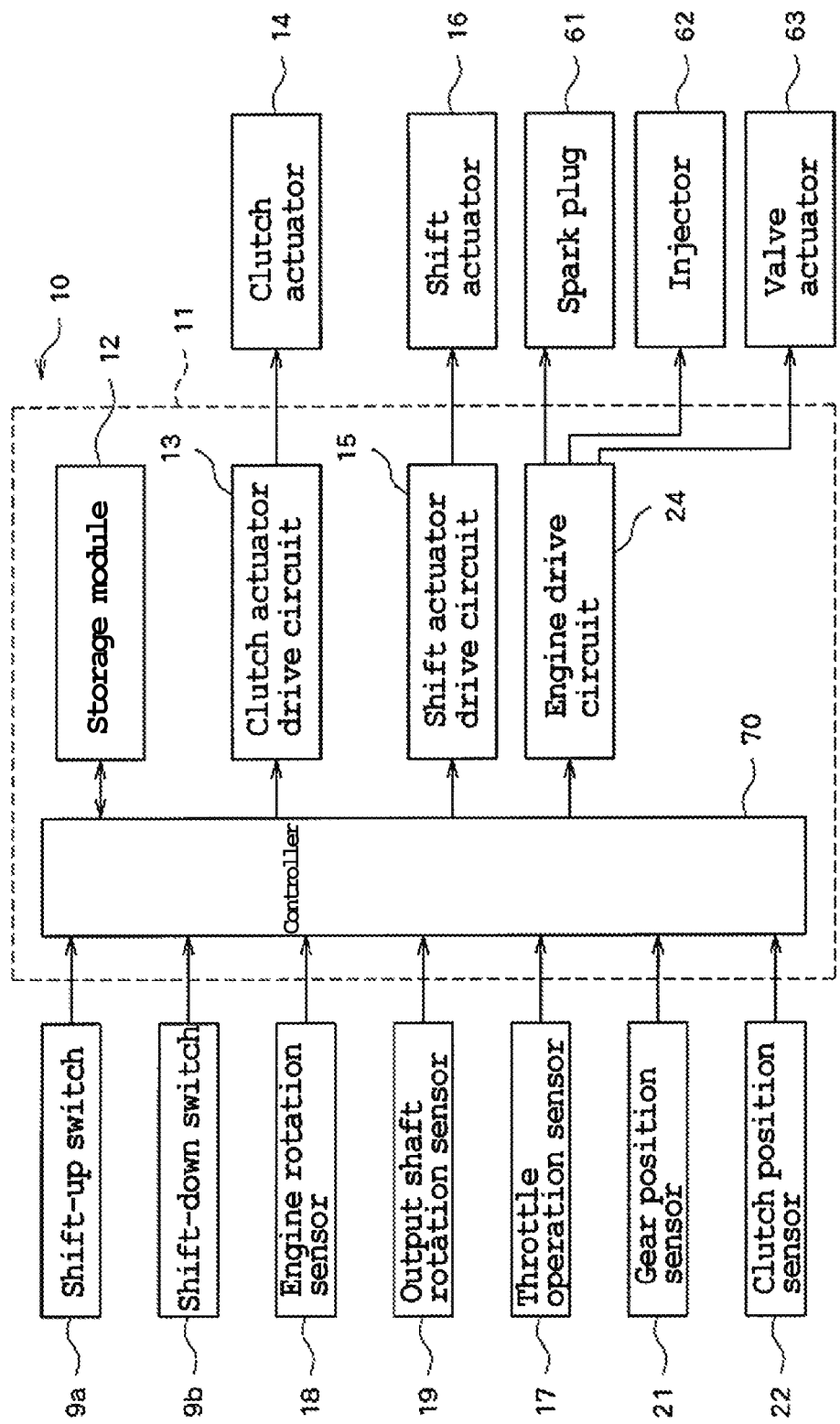
FIG. 4 is a block diagram illustrating the configuration of the gear change control device.

The configuration of the gear change control device 10 is described next. The motorcycle 1 is a semiautomatic vehicle, and the operation of the clutch 40 and the displacement of the speed-change gears 53c, 53d, 54b and 54e are provided by the gear change control device 10. FIG. 4 is a block diagram illustrating the configuration of the gear change control device 10. As shown in FIG. 2 or FIG. 4, the gear change control device 10 includes an electronic control unit 11, the clutch actuator 14, the shift actuator 16, a throttle operation sensor 17, an engine rotation sensor 18, an output shaft rotation sensor 19, a gear position sensor 21, a clutch position sensor 22, a shift-up switch 9a, and a shift-down switch 9b. The electronic control unit 11 is provided with a controller 70, a storage module 12, a clutch actuator drive circuit 13, a shift actuator drive circuit 15, and an engine drive circuit 24.

The storage module 12 has a RAM (Random Access Memory), a ROM (Read Only Memory) or the like. The controller 70 has a CPU (Central Processing Unit), and operates according to a program stored in the storage module 12. Here, the controller 70 actuates the clutch actuator 14 and the shift actuator 16 to control the clutch 40 and the transmission 50 in response to a gear change command, that is, in response to operation of the rider to turn on the shift-up switch 9a or the shift-down switch 9b. The controller 70 also executes a control operation to reduce the output torque of the engine 30 in response to a gear change command. The control operation that the controller 70 executes is described in detail later.

The clutch actuator drive circuit 13 supplies the clutch actuator 14 with driving power according to a signal inputted from the controller 70. The clutch actuator 14 includes, for example, a motor, a solenoid, and a power transmission mechanism (such as a hydraulic pressure path or wire) for transmitting the power of the motor and solenoid to the clutch 40, and operates on electric power supplied from the clutch actuator drive circuit 13. For example, when the clutch actuator 14 shifts the clutch 40 to the disengaged side, the clutch actuator 14 separates the driving-side friction member 41 and the driven-side friction member 42 against the elastic force of the clutch spring 44 to reduce the pressure exerted therebetween. When the clutch actuator 14 shifts the clutch 40 to the engaged state, the clutch actuator 14 allows the driving-side friction member 41 and the driven-side friction member 42 to be pressed gradually against each other by the clutch spring 44. As a result, the driving-side friction member 41 and the driven-side friction member 42 receive the elastic force of the clutch spring 44 and are pressed against each other again.

The shift actuator drive circuit 15 supplies the shift actuator 16 with driving power according to a signal inputted from the controller 70. The shift actuator 16 includes, for example, a motor and a power transmission mechanism (such as a rod) for transmitting the power of the motor to the shift cam 56b, and operates on electric power supplied from the shift actuator drive circuit 15. The shift actuator 16 actuates the gear switching mechanism 56 to selectively displace the speed-change gears 53c, 53d, 54b and 54e axially. More specifically, the shift actuator 16 rotates the shift cam 56b through a preset angle every time a gear change command is inputted.

The engine drive circuit 24 supplies driving power to various electrical components of the engine 30 in response to signals inputted from the controller 70. Here, the engine drive circuit 24 includes a drive circuit for supplying the spark plug 61 with electric power, a drive circuit for supplying the injector 62 with electric power, and a drive circuit for supplying the valve actuator 63 with electric power. The controller 70 controls the operation of the spark plug 61, the injector 62 or the valve actuator 63 to control the output torque of the engine 30.

The throttle operation sensor 17 detects the amount of the throttle grip 5a operated by the rider (which is hereinafter referred to as "throttle operation amount $S_{ope}$"), and outputs a signal proportional to the rotational angle of the throttle grip 5a. The controller 70 detects the throttle operation amount $S_{ope}$ based on the signal outputted from the throttle operation sensor 17, and actuates the valve actuator 63 so that the throttle valve 37a opens by an angle corresponding to the throttle operation amount $S_{ope}$.

The gear position sensor 21 detects the positions of the speed-change gears 53c, 53d, 54b and 54e, which are moved when changing gears, and is constituted, for example, of a potentiometer which outputs a signal proportional to the rotational angle of the shift cam 56b. The controller 70 detects the positions of the speed-change gears 53c, 53d, 54b and 54e based on the signal outputted from the gear position sensor 21.

The clutch position sensor 22 detects the actuating condition of the clutch 40 (the degree of engagement of the clutch 40). The actuating position of the clutch actuator 14 corresponds to the actuating condition of the clutch 40, and the clutch position sensor 22 is constituted, for example, of a potentiometer which outputs a signal corresponding to the actuating position of the clutch actuator 14. The controller 70 detects the actuating position of the clutch actuator 14 as clutch position $P_c$.

The shift-up switch 9a and the shift-down switch 9b are used by the rider to command the gear change control device 10 to change gears, and are located, for example, on the handle bar 5 as shown in FIG. 2. The shift-up switch 9a and the shift-down switch 9b input a signal indicating a switch operation of the rider into the controller 70 as a gear change command.

The engine rotation sensor 18 detects the rotational speed of a mechanism disposed upstream of the clutch 40, such as the rotational speed of the engine 30 (which is hereinafter referred to as "engine rotational speed $N_e$") or the rotational speed of the driving-side friction member 41 (which is hereinafter referred to as "driving-side rotational speed $N_{up}$"). The engine rotation sensor 18 may be constituted, for example, of a crank angle sensor which outputs pulse signals at a frequency proportional to the rotational speed of the crankshaft 34 or a sensor which outputs pulse signals at a frequency proportional to the rotational speed of the primary reduction gears 36a and 36b.

The output shaft rotation sensor 19 detects the rotational speed of a mechanism disposed downstream of the clutch 40, such as the vehicle speed V or the rotational speed of the driven-side friction member 42 (which is hereinafter referred to as "driven-side rotational speed $N_{low}$"). The output shaft rotation sensor 19 may be implemented, for example, as a sensor which outputs pulse signals at a frequency proportional to the rotational speed of the speed-change gears 54b and 54e, which rotate together with the output shaft 55. As a sensor for calculating the vehicle speed V or the driven-side rotational speed $N_{low}$, a sensor which outputs a signal proportional to the rotational speed of the main shaft 52 or the axle 3a may be provided instead of the output shaft rotation sensor 19.

Figure 5:
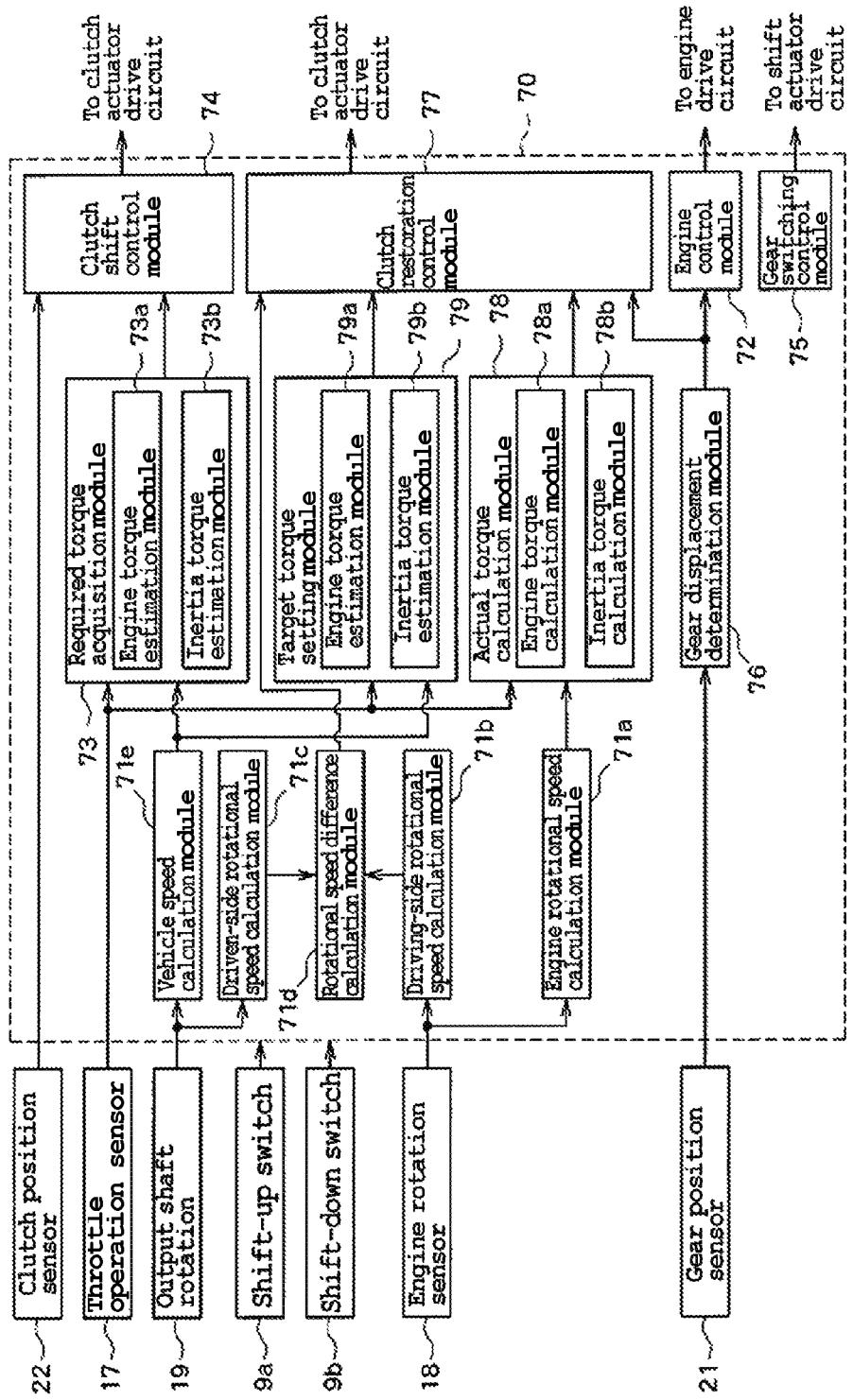
FIG. 5 is a functional block diagram of a control module of the gear change control device in which sensors for inputting signals to the control module as well as the control module are shown.

The control operation that the controller 70 executes is described next. FIG. 5 is a functional block diagram of the controller 70. In the drawing, the sensors which output signals to the controller 70 as well as the controller 70 are shown. As shown in the drawing, the controller 70 includes an engine rotational speed calculation module 71a, a driving-side rotational speed calculation module 71b, a driven-side rotational speed calculation module 71c, a rotational speed difference calculation module 71d, a vehicle speed calculation module 71e, an engine control module 72, a required torque acquisition module 73, a clutch shift control module 74, a gear switching control module 75, a gear displacement determination module 76, a clutch restoration control module 77, an actual torque calculation module 78, and a target torque setting module 79.

Figure 6:
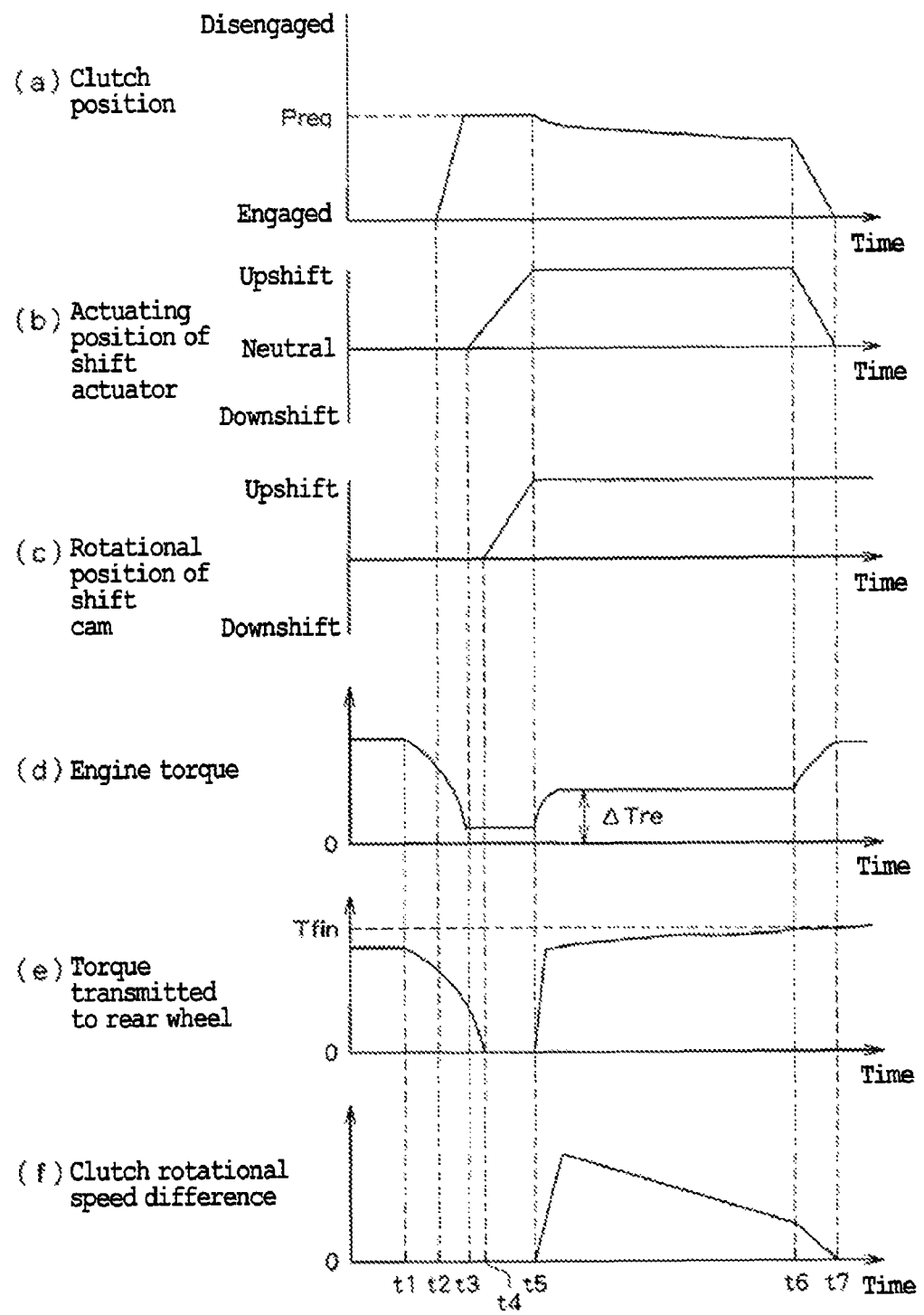
FIG. 6 is a time chart for use in explaining the operation of the gear change control device, in which graph (a) shows the clutch position over time, graph (b) shows the actuating position of a shift actuator over time, graph (c) shows the rotational position of a shift cam over time, graph (d) shows the output torque of an engine over time, graph (e) shows the torque transmitted to a rear wheel over time, and graph (f) shows the difference between driving-side rotational speed and driven-side rotational speed over time.

The control operation that the controller 70 executes is described first. FIG. 6 is a time chart for use in explaining the control operation that the controller 70 executes at the time of gear change. FIG. 6(a) shows the clutch position $P_c$ over time. FIG. 6(b) shows the actuating position of the shift actuator 16 over time. FIG. 6(c) shows the rotational position of the shift cam 56b over time. FIG. 6(d) shows the output torque of the engine 30 over time. FIG. 6(e) shows the torque transmitted to the rear wheel 3 over time. FIG. 6(f) shows the difference between the driving-side rotational speed $N_{up}$ and the driven-side rotational speed $N_{low}$ (which is hereinafter referred to as "clutch rotational speed difference $N_{diff}$ ($N_{diff}=N_{up}-N_{low}$)") over time. Here, the description refers to the case where an upshift is commanded as an example.

When a gear change command is inputted into the controller 70 from the shift-up switch 9a at $t_1$, the engine control module 72 starts a control operation to reduce the output torque of the engine 30 (which is hereinafter referred to as "engine torque") as shown in FIG. 6(d) (which is hereinafter referred to as "output reduction control operation" (for example, spark delay control operation)). By the output reduction control operation, the engine torque is reduced to a preset torque (for example, zero or a value slightly higher than zero) or reduced by a preset amount.

Also, the gear switching control module 75 actuates the shift actuator 16 in the shift-up direction from the neutral position ($t_3$) as shown in FIG. 6(b) in response to the input of the gear change command. As a result, the shift cam 56b is rotated by the gear switching mechanism 56 as shown in FIG.

6(c), and the engagement of the two speed-change gears corresponding to the gear step before the reception of the gear change command (which are hereinafter referred to as "previous-gear-step gears") is released and displacement of the new-gear-step movable gear is started at $t_4$. Then, the new-gear-step movable gear is engaged with the new-gear-step stationary gear and the displacement of the new-gear-step movable gear is completed at $t_5$. It should be noted that in this embodiment, since the engine control module 72 is executing the output reduction control operation, the torque transmitted to the transmission 50 via the clutch 40 has been reduced and the force necessary to release the engagement of the previous-gear-step gears has also been reduced.

Also, when a gear change command is inputted, the clutch shift control module 74 shifts the clutch 40, which has been set in the engaged state during running until then, to the disengaged side ($t_2$) as shown in FIG. 6(a). In this embodiment, in particular, the clutch shift control module 74 does not set the clutch 40 in the disengaged state but shifts the clutch 40 to an intermediate state between the engaged state and the disengaged state where the driving-side friction member 41 and the driven-side friction member 42 are pressed against each other at a pressure lower than in the engaged state. In the intermediate state, since the pressure between the driving-side friction member 41 and the driven-side friction member 42 is not completely released, the clutch 40 can transmit some torque to the downstream side (that is, the rear wheel 3 side). Also, the clutch shift control module 74 sets the clutch 40 in the intermediate state before the displacement of the new-gear-step movable gear is completed at $t_5$. Thus, transmission of torque to the rear wheel 3 is temporarily interrupted when the engagement of the previous-gear-step gears is released ($t_4$) but is resumed when the new-gear-step movable gear and the new-gear-step stationary gear are engaged with each other ($t_5$) as shown in FIG. 6(e). It should be noted that since the engine control module 72 is executing the output reduction control operation, the torque transmitted to the rear wheel 3 gradually decreases after the input of the gear change command.

Also, the above procedure can prevent increase in the engine rotational speed $N_e$ during a gear change. That is, in a conventional control operation, the clutch is once set in a disengaged state, and is shifted to an intermediate state where the transmission of torque to the rear wheel starts after the new-gear-step movable gear and the new-gear-step stationary gear are engaged with each other. Since no torque is transmitted via the clutch before the clutch reaches the intermediate state from the disengaged stated, the engine idles during all that time and the engine rotational speed increases. In this embodiment, however, since the clutch 40 starts transmission of torque at $t_5$ when the new-gear-step movable gear and the new-gear-step stationary gear are engaged with each other, the time during which the engine 30 is idling is reduced and, therefore, an increase in the engine rotational speed $N_e$ is prevented.

In addition, in this embodiment, the torque required to be transmitted to the downstream side by the clutch 40 during the gear change (while the clutch 40 is restored from the intermediate state to the engaged state) (which is hereinafter referred to as "required torque $T_{req}$") is calculated by the required torque acquisition module 73, and the clutch position in the intermediate state (which is hereinafter referred to as "required clutch position $P_{req}$," see FIG. 6(a)) is set based on the required torque $T_{req}$. In general, the driving-side friction member and the driven-side friction member of a friction clutch are pressed against each other at a pressure corresponding to the clutch position, and torque proportional to the pressure is transmitted via the friction clutch. Thus, the clutch position and the torque transmitted via the friction clutch are correlated with each other. Therefore, when the new-gear-step movable gear and the new-gear-step stationary gear are engaged with each other at $t_5$, torque corresponding to the required torque $T_{req}$ is transmitted to the rear wheel 3 via the clutch 40 and the transmission 50 at that time (see FIG. 6(e)).

In a more preferred embodiment, a clutch position $P_c$, where the driving-side friction member 41 and the driven-side friction member 42 are pressed against each other at a pressure which produces no clutch rotational speed difference $N_{diff}$ until the new-gear-step movable gear and the new-gear-step stationary gear are engaged with each other, is set as the required clutch position $P_{req}$. That is, a friction clutch has a clutch position range, including a clutch position $P_c$ near the engaged position, in which the driving-side friction member 41 and the driven-side friction member 42 are pressed against each other at a pressure which produces no clutch rotational speed difference $N_{diff}$ until the new-gear-step movable gear and the new-gear-step stationary gear are engaged with each other. A clutch position $P_c$ within the range and corresponding to the required torque $T_{req}$ is set as the required clutch position $P_{req}$.

As such a clutch position $P_c$ is set as the clutch position $P_{req}$, no clutch rotational speed difference $N_{diff}$ is produced until the new-gear-step movable gear and the new-gear-step stationary gear are engaged with each other at $t_5$ as shown in FIG. 6(f). When the gears are engaged with each other at $t_5$, the mechanism from the driven-side friction member 42 to the rear wheel 3 starts rotating together, the driven-side friction member 42 slips relative to the driving-side friction member 41, and a clutch rotational speed difference $N_{diff}$ is produced. Accordingly, an increase in the rotational speed of the mechanism upstream of the clutch 40, that is, the engine rotational speed $N_e$, is prevented not only after the new-gear-step movable gear and the new-gear-step stationary gear are engaged with each other at $t_5$ but also between $t_4$ when the engagement of the previous-gear-step gears is released and $t_5$. The procedure to set the required torque $T_{req}$ and the required clutch position $P_{req}$ is described in detail later.

As shown in FIG. 6(a), the clutch restoration control module 77 starts a control operation to restore the clutch 40 from the intermediate state to the engaged state (which is hereinafter referred to as "restoration control operation") after the displacement of the new-gear-step movable gear is completed at $t_5$. More specifically, the clutch restoration control module 77 actuates the clutch actuator 14 and changes the clutch position $P_c$ slowly. During the restoration control operation, the driving-side friction member 41 and the driven-side friction member 42 are gently pressed against each other, and the clutch rotational speed difference $N_{diff}$ is gradually eliminated as shown in FIG. 6(f). Then, when the clutch rotational speed difference $N_{diff}$ falls below a predetermined rotational speed difference (which is hereinafter referred to as "gear change-completion determination value Nth") at $t_6$, the clutch restoration control module 77 fully engages the clutch 40 to restore it to the engaged state ($t_7$). This completes the gear change by the gear change control device 10.

The procedure to set the required torque $T_{req}$ and the required clutch position $P_{req}$ is described next. The required torque acquisition module 73 estimates the torque to be transmitted via the clutch 40 after the clutch 40 is restored to the engaged state (which is hereinafter referred to as "post-completion torque $T_{fin}$") based on an operating condition before a control operation at gear change (such as the output reduction control operation described above or the control operation to shift the clutch 40 to the intermediate state) is started. Then, the required torque acquisition module 73 sets the required torque $T_{req}$ based on the post-completion torque $T_{fin}$, and the clutch shift control module 74 sets the required clutch position $P_{req}$ depending on the required torque $T_{req}$. Therefore, the torque to be transmitted to the rear wheel 3 when the restoration of the clutch 40 to the engaged state is completed (torque $T_{fin}$ at $t_7$) or torque close to it can be transmitted to the rear wheel 3 when the new-gear-step movable gear and the new-gear-step stationary gear are engaged with each other as shown in FIG. 6(e), and fluctuation in torque which is transmitted to the rear wheel 3 when the engagement is completed can be prevented.

The engine control module 72 eases the execution of the output reduction control operation when the displacement of the new-gear-step movable gear is completed at $t_5$ as shown in FIG. 6(d) to restore the engine torque by a preset amount (which is hereinafter referred to as "intermediate restoration torque $\Delta T_{re}$"). After that, when the clutch rotational speed difference $N_{diff}$ falls below the gear change-completion determination value Nth at $t_6$, the output reduction control operation is completely terminated to restore the engine torque to the level during normal running.

The procedures performed by the various modules of the controller 70 are described next in detail.

The engine rotational speed calculation module 71a calculates the engine rotational speed $N_e$ based on a signal outputted from the engine rotation sensor 18. The driving-side rotational speed calculation module 71b calculates the driving-side rotational speed $N_{up}$ based on, for example, a signal outputted from the engine rotation sensor 18 and the reduction ratio of the primary speed reduction mechanism 36. The driven-side rotational speed calculation module 71c calculates the driven-side rotational speed $N_{low}$ based on a signal outputted from the output shaft rotation sensor 19 and the reduction ratio of the speed-change gears transmitting torque from the main shaft 52 to the output shaft 55 in the transmission 50. The rotational speed difference calculation module 71d calculates the clutch rotational speed difference $N_{diff}$ ($N_{up}-N_{low}$) based on the driven-side rotational speed $N_{low}$ and the driving-side rotational speed $N_{up}$. The vehicle speed calculation module 71e calculates the vehicle speed V based on a signal outputted from the output shaft rotation sensor 19.

As described above, the engine control module 72 starts the output reduction control operation to reduce the engine torque when a gear change command is inputted, and reduces the engine torque to preset torque or reduces the engine torque by a preset amount. For example, the engine control module 72 executes a spark delay control operation to cause the spark plug 61 to ignite later than it does during normal running, a control operation to reduce the amount of intake air into the cylinder 31 by reducing the opening of the throttle valve 37a with respect to the throttle operation amount $S_{ope}$, or a control operation to reduce the fuel injection amount from the injector 62 as the output reduction control.

Also, the engine control module 72 restores the engine torque in a stepwise fashion after the displacement of the new-gear-step movable gear is completed. For example, as described above, the engine control module 72 partially eases the execution of the output reduction control operation by slightly restoring the ignition timing from that during the output reduction control operation or restoring the opening of the throttle valve 37a with respect to the throttle operation amount $S_{ope}$ when the displacement of the new-gear-step movable gear is completed (at $t_5$ in FIG. 6). Then, the engine control module 72 restores the engine torque to a torque lower than the engine torque before the start of the output reduction control operation or restores the engine torque by the intermediate restoration torque $\Delta T_{re}$ described above. After that, when the clutch rotational speed difference $N_{diff}$ falls below the gear change-completion determination value Nth (at $t_6$ in FIG. 6), the engine control module 72 restores the engine torque to the torque before the output reduction control operation is started by, for example, restoring the ignition timing to the timing during normal running. The control operation to restore the engine torque TE is not limited to the control operation described above. For example, the engine control module 72 may gradually increase the engine torque after the displacement of the new-gear-step movable gear is completed.

The required torque acquisition module 73, as described above, estimates the torque to be transmitted to the clutch 40 (that is, post-completion torque $T_{fin}$) after the restoration of the clutch 40 to the engaged state based on an operating condition before the start of a control operation at gear change, and calculates the required torque $T_{req}$ based on the post-completion torque $T_{fin}$. Here, before the start of a control operation at gear change means, for example, before the shifting of the clutch 40 to the intermediate state is started or before the output reduction control operation is started as described above. The procedure may be performed, for example, as follows.

As shown in FIG. 5, the required torque acquisition module 73 includes an engine torque estimation module 73a for estimating the engine torque at the time when the clutch 40 is restored to the engaged state (at $t_7$ in FIG. 6) (which is hereinafter referred to as "post-completion engine torque $TE_{fin}$"), and an inertia torque estimation module 73b for estimating the inertia torque which is generated by the inertia of the mechanism upstream of the clutch 40 (the engine 30, the primary speed reduction mechanism 36, etc.) when the clutch 40 is restored to the engaged state (which is hereinafter referred to as "post-completion inertia torque $TI_{fin}$"). The required torque acquisition module 73 calculates the post-completion torque $T_{fin}$ based on the post-completion engine torque $TE_{fin}$ and the post-completion inertia torque $TI_{fin}$.

The procedure performed by the engine torque estimation module 73a is described first. The engine torque estimation module 73a first estimates the engine rotational speed at the time when the clutch 40 is restored to the engaged state (which is hereinafter referred to as "post-completion engine rotational speed $N_{efin}$") based on an operating condition (such as the vehicle speed V or the engine rotational speed $N_e$) before the start of a control operation at gear change. For example, the engine torque estimation module 73a multiplies the vehicle speed V, the reduction ratio $R_t$ of the transmission mechanism 57, the reduction ratio $R_{newgear}$ of the gear step newly set by the gear change command and the reduction ratio $R_p$ of the primary speed reduction mechanism 36 together, and sets the resulting value as the post-completion engine rotational speed $N_{efin}$ ($N_{efin}=V \times R_t \times Rnewgear \times R_p$). The engine torque estimation module 73a may correct the thus calculated value based on the engine rotational speed $N_e$ before the start of a control operation at gear change, and set the resulting value as the post-completion engine rotational speed $N_{efin}$.

In the storage module 12, a map (which is hereinafter referred to as "engine torque map") or calculation formula for associating the engine rotational speed $N_e$ and throttle operation amount $S_{ope}$ with the engine torque is previously stored. The engine torque estimation module 73a detects the throttle operation amount $S_{ope}$ before the start of a control operation at gear change, acquires the engine torque corresponding to the calculated post-completion engine rotational speed $N_{efin}$ and the throttle operation amount $S_{ope}$ with reference to the engine torque map or the like, and sets the engine torque as the post-completion engine torque $TE_{fin}$.

The time when the vehicle speed V and the throttle operation amount $S_{ope}$ are detected is a predetermined time period (a few hundred milliseconds, for example) before the time when the clutch shift control module 74 starts the displacement of the clutch 40 (at $t_2$ in FIG. 6) or when a gear change command is inputted (at $t_1$ in FIG. 6), for example.

The procedure performed by the inertia torque estimation module 73b is described next. The post-completion inertia torque $TI_{fin}$ is the torque estimated to be generated by the inertia of the mechanism upstream of the clutch 40 when the clutch 40 is restored to the engaged state as described above, and is a value obtained by multiplying the rate of change in the engine rotational speed $N_e$ while the clutch 40 is restored to the engaged state (which is hereinafter referred to as "engine rotational acceleration $dN_{efin}/dt$") by the inertia moment I of the mechanism on the upstream side ($I \times (dN_{efin}/dt)$). The engine rotational acceleration $dN_{efin}/dt$ is a value dependent on the rotational acceleration of the mechanism downstream of the clutch 40 (the vehicle acceleration dV/dt, for example) before the start of a control operation at gear change. Thus, the inertia torque estimation module 73b calculates the vehicle acceleration dV/dt before the start of a control operation at gear change, and sets a value obtained by multiplying the acceleration dV/dt, the reduction ratio $R_t$ of the transmission mechanism 57, the reduction ratio $R_{newgear}$ of the gear step newly set by the gear change command and the reduction ratio $R_p$ of the primary speed reduction mechanism 36 together as the engine rotational acceleration $dN_{efin}/dt$ at the time when the clutch 40 is restored to the engaged state ($dN_{efin}/dt = dV/dt \times R_t \times R_{newgear} \times R_p$). Then, the inertia torque estimation module 73b multiplies the engine rotational acceleration $dN_{efin}/dt$ by the inertia moment I, and sets the resulting value as the post-completion inertia torque $TI_{fin}$ ($TI_{fin} = I \times dN_{efin}/dt$). The inertia torque estimation module 73b performs the above procedure based on the vehicle acceleration dV/dt for example at a predetermined time period (a few hundred milliseconds, for example) before the clutch shift control module 74 starts the displacement of the clutch 40 or at the time of input of the gear change command.

It should be noted that the procedure performed by the inertia torque estimation module 73b is not limited to the procedure described above and various modifications may be made to it. For example, the procedure performed by the inertia torque estimation module 73b may estimate the engine rotational acceleration $dN_{efin}/dt$ at the time when the clutch 40 is restored to the engaged state based on the rotational acceleration $dN_{low}/dt$ of the driven-side friction member 42 before the start of a control operation at gear change, the reduction ratio $R_p$ of the primary speed reduction mechanism, etc. The inertia torque estimation module 73b may correct the thus calculated engine rotational acceleration $dN_{efin}/dt$ and the post-completion inertia torque $TI_{fin}$ based on the operating conditions of the vehicle and the corrected engine rotational acceleration $dN_{efin}/dt$ may be used in the subsequent procedure.

The torque transmitted to the downstream side via the clutch 40 in the intermediate state is equal to the difference between the engine torque and the inertia torque generated by the inertia of the mechanism upstream of the clutch 40 (engine torque−inertia torque). That is, when the engine rotational speed $N_e$ is increasing, the difference between the engine torque and the torque contributing to increase in the engine rotational speed $N_e$ (that is, inertia torque) is transmitted to the downstream side via the clutch 40. When the engine rotational speed $N_e$ is decreasing, the inertia torque generated by decrease in the engine rotational speed $N_e$, in addition to the engine torque, is transmitted via the clutch 40.

Thus, the required torque acquisition module 73 (FIG. 5) calculates the post-completion torque $T_{fin}$, based on the post-completion inertia torque $TI_{fin}$ and the post-completion engine torque $TE_{fin}$, obtained by the procedure described above. For example, the required torque acquisition module 73 may subtract the post-completion inertia torque $TI_{fin}$ from the post-completion engine torque $TE_{fin}$, and set the resulting value as the post-completion torque $T_{fin}$, ($T_{fin} = TE_{fin} - TI_{fin}$). Then, the required torque acquisition module 73 may determine the required torque $T_{req}$ based on the post-completion torque $T_{fin}$. For example, the required torque acquisition module 73 may set the post-completion torque $T_{fin}$, as the required torque $T_{req}$, or may set a value obtained by slightly varying the post-completion torque $T_{fin}$, as the required torque $T_{req}$. For example, a value obtained by adding or subtracting a preset value to or from the post-completion torque $T_{fin}$, may be set as the required torque $T_{req}$.

The clutch shift control module 74 is described next. The clutch shift control module 74 first determines the clutch position $P_c$ in the intermediate state, that is, the required clutch position $P_{req}$, based on the required torque $T_{req}$ obtained by the above procedure. For example, a map or calculation formula for associating the required torque $T_{req}$ with the required clutch position $P_{req}$ (the map is hereinafter referred to as "required clutch position map") is previously stored in the storage module 12. The clutch shift control module 74 acquires the required clutch position $P_{req}$ corresponding to the required torque $T_{req}$ obtained by the above procedure with reference to the required clutch position map or the like.

Figure 7:
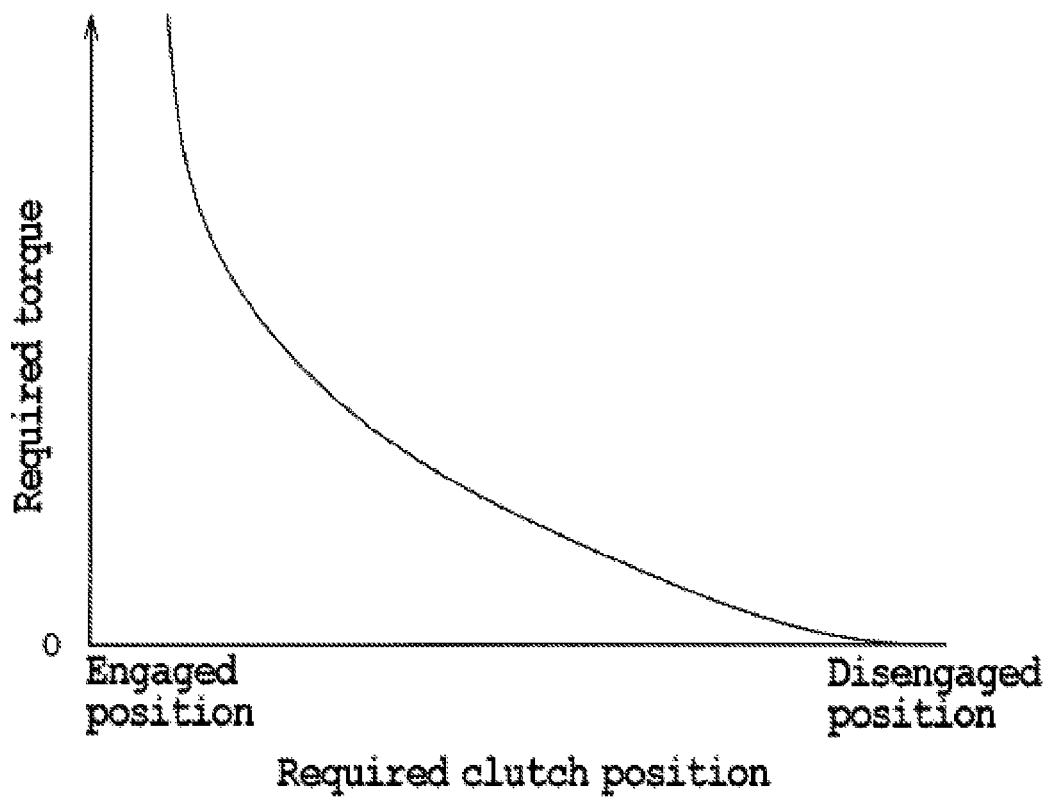
FIG. 7 is a graph showing an example of a map for associating required torque with required clutch position.

FIG. 7 is a graph showing an example of the required clutch position map. In the drawing, the horizontal axis represents the required clutch position $P_{req}$ and the vertical axis represents the required torque $T_{req}$. As shown in the drawing, the required clutch position map is set up such that the required clutch position $P_{req}$ approaches the engaged position as the required torque $T_{req}$ increases.

As described above, the clutch position in a friction clutch is correlated with the torque transmitted via the friction clutch. Thus, in the required clutch position map, each required clutch position $P_{req}$ is set such that when the clutch 40 is set at the position, torque generally equal to the required torque $T_{req}$ is transmitted via the clutch 40. Also, in the required clutch position map, a clutch position $P_c$ where the driving-side friction member 41 and the driven-side friction member 42 are pressed against each other at a pressure lower than in the engaged state is set as each required clutch position $P_{req}$. In addition, a clutch position $P_c$ in a range in which the driving-side friction member 41 and the driven-side friction member 42 are pressed against each other at a pressure which produces no clutch rotational speed difference $N_{diff}$ until the new-gear-step movable gear and the new-gear-step stationary gear are engaged with each other is set as each required clutch positions $P_{req}$.

The clutch shift control module 74 sets the clutch 40 in an intermediate state in which the clutch position $P_c$ detected by the clutch position sensor 22 is the same as the required clutch position $P_{req}$ before the new-gear-step movable gear and new-gear-step stationary gear are engaged with each other (before $t_5$ in FIG. 6).

In this example, the time when the gear switching control module 75 starts actuation of the shift actuator 16 (at $t_3$ in FIG. 6) and the time when the clutch shift control module 74 starts actuation of the clutch actuator 14 (at $t_2$ in FIG. 6) are previously set, as described later, so that the clutch position $P_c$ of the clutch 40 can reach the required clutch position $P_{req}$ before the new-gear-step movable gear and the new-gear-step stationary gear are engaged with each other.

The gear switching control module 75 starts actuation of the shift actuator 16 in response to an input of a gear change command. The shift cam 56b is therefore rotated through a preset angle and the new-gear-step movable gear is displaced. Then, the gear switching control module 75 engages the new-gear-step movable gear and the new-gear-step stationary gear by their dog clutches 51a and 51b while the clutch 40 is set in the above intermediate state under the control of the clutch shift control module 74.

The gear displacement determination module 76 determines whether or not the new-gear-step movable gear and the new-gear-step stationary gear have been engaged with each other and the displacement of the new-gear-step movable gear has been completed based on a signal outputted from the gear position sensor 21.

After the gear displacement determination module 76 detects the completion of the displacement of the new-gear-step movable gear, the clutch restoration control module 77 actuates the clutch actuator 14 and executes the restoration control operation to shift the clutch 40, which has been set in the above intermediate state, to the engaged state.

In the example described here, the controller 70 includes the actual torque calculation module 78 and the target torque setting module 79 as described above. The actual torque calculation module 78 calculates the torque which is actually being transmitted by the clutch 40 during the restoration control operation (which is hereinafter referred to as "actual torque $T_{ac}$") at predetermined intervals (approximately 10 milliseconds). The target torque setting module 79 sets the torque which is required to be transmitted by the clutch 40 during the restoration control operation (which is hereinafter referred to as "target torque $T_{tg}$"). Here, the target torque setting module 79, as with the above described required torque acquisition module 73, estimates the torque to be transmitted via the clutch 40 after the restoration of the clutch 40 to the engaged state, and sets the thus estimated torque as the target torque $T_{tg}$. The clutch restoration control module 77 controls the clutch 40 based on the actual torque $T_{ac}$ and target torque $T_{tg}$ obtained by the procedures. More specifically, the clutch restoration control module 77 controls the clutch 40 so that the actual torque $T_{ac}$ will be equal to the target torque $T_{tg}$.

Figure 8:
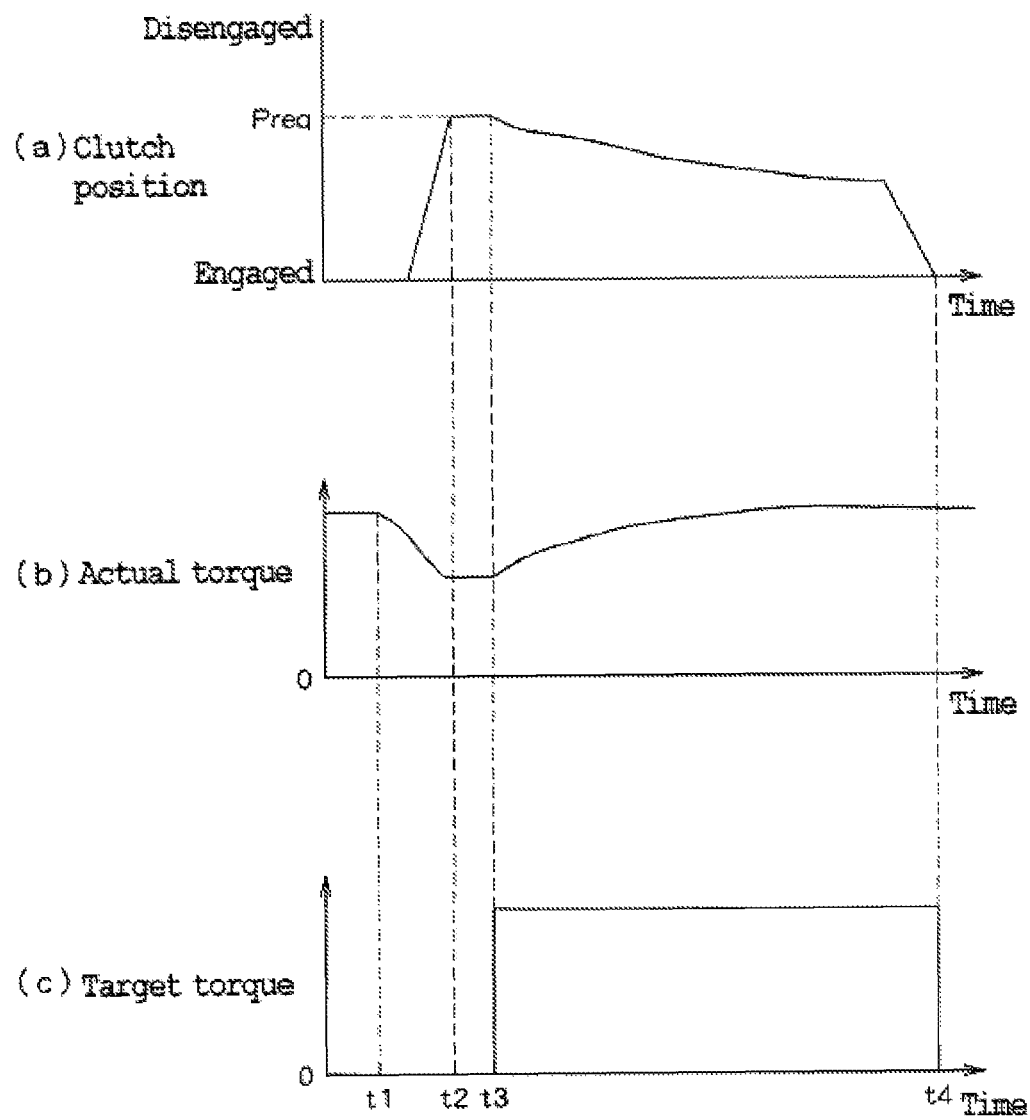
FIG. 8 is a time chart for use in explaining an example of a control operation to restore the clutch set in an intermediate state to the engaged state, in which graph (a) shows the clutch position over time, graph (b) shows the actual torque over time, and graph (c) shows the target torque $T_{tg}$ over time.

FIG. 8 is a time chart for use in explaining the restoration control operation. FIG. 8(a) shows the clutch position $P_c$ over time. FIG. 8(b) shows the actual torque $T_{ac}$ over time. FIG. 8(c) shows the target torque $T_{tg}$ over time. In the drawing, $t_1$ is the time when a gear change command is inputted, $t_2$ is the time when the clutch position $P_c$ of the clutch 40 is set at the required clutch position $P_{req}$, $t_3$ is the time when the new-gear-step movable gear and the new-gear-step stationary gear are engaged with each other, and $t_4$ is the time when the clutch 40 is restored to the engaged state.

As shown in FIGS. 8(a) and (b), when the clutch position $P_c$ of the clutch 40 is set at the required clutch position $P_{req}$ at $t_2$, the actual torque $T_{ac}$ decreases from the torque which has been transmitted via the clutch 40 during running until then. Then, the torque corresponding to the required clutch position $P_{req}$ is transmitted as the actual torque $T_{ac}$ until the new-gear-step movable gear and the new-gear-step stationary gear are engaged with each other at $t_3$. It should be noted that, as described above, transmission of torque to the rear wheel 3 is interrupted in the transmission 50 from the time when the engagement of the previous-gear-step gears is released to the time when the new-gear-step movable gear and the new-gear-step stationary gear are engaged with each other even between $t_2$ and $t_3$.

When the completion of the displacement of the new-gear-step movable gear is detected at $t_3$, the target torque setting module 79 estimates the torque to be transmitted via the clutch 40 at $t_4$, and sets the thus estimated torque as the target torque $T_{tg}$. Then, the clutch restoration control module 77 starts the restoration control operation, and gradually changes the clutch position $P_c$ so that the actual torque $T_{ac}$ tracks the target torque $T_{tg}$. For example, as shown in FIGS. 8(b) and (c), when the actual torque $T_{ac}$ is lower than the target torque $T_{tg}$, the clutch restoration control module 77 gradually moves the clutch position $P_c$ closer to the engaged position to cause the actual torque $T_{ac}$ to approach the target torque $T_{tg}$. Then, when the clutch rotational speed difference $N_{diff}$ falls below the gear change-completion determination value Nth, the clutch restoration control module 77 fully engages the clutch 40 ($t_4$). At this time, since the actual torque $T_{ac}$ has become equal to the target torque $T_{tg}$ as a result of the control operation so far, fluctuation of the actual torque $T_{ac}$ is prevented.

The procedure to calculate the actual torque $T_{ac}$ and the target torque $T_{tg}$ is described below. The actual torque calculation module 78 calculates the actual torque $T_{ac}$ based on an operating condition of the vehicle during the restoration control operation. In the example described here, the actual torque calculation module 78 includes an engine torque calculation module 78a for calculating the actual engine torque during the restoration control operation (which is hereinafter referred to as "actual engine torque $TE_{ac}$"), and an inertia torque calculation module 78b for calculating the torque being generated by the inertia of the mechanism upstream of the clutch 40 during the restoration control operation (which is hereinafter referred to as "actual inertia torque $TI_{ac}$"). The actual torque calculation module 78 calculates the actual torque $T_{ac}$ based on the actual engine torque $TE_{ac}$ and the actual inertia torque $TI_{ac}$ obtained by the procedures.

The procedure to calculate the actual engine torque $TE_{ac}$ is described first. As described above, the engine torque map or a calculation formula for associating the engine rotational speed $N_e$ and the throttle operation amount $S_{ope}$ with the engine torque is stored in the storage module 12. The engine torque calculation module 78a acquires the engine torque corresponding to the detected or calculated throttle operation amount $S_{ope}$ and engine rotational speed $N_e$ as the actual engine torque $TE_{ac}$ with reference to the engine torque map or the like, for example. It should be noted that the procedure to calculate the actual engine torque $TE_{ac}$ is not limited to the above procedure. For example, the engine torque calculation module 78a may calculate the actual engine torque $TE_{ac}$ based on the pressure of air flowing through the intake passage 35 (which is hereinafter referred to as "intake pressure").

The actual inertia torque $TI_{ac}$ is a value obtained by multiplying the rate of change in the engine rotational speed $N_e$ during the restoration control operation (that is, the engine rotational acceleration $dN_e/dt$) by the inertia moment I of the mechanism upstream of the clutch 40 ($I \times (dN_e/dt)$). Thus, the actual inertia torque calculation module 78b calculates the engine rotational acceleration $dN_e/dt$ from the engine rotational speed $N_e$, multiplies the engine rotational acceleration $dN_e/dt$ by the inertia moment I, and sets the resulting value as the actual inertia torque $TI_{ac}$ ($TI_{ac} = I \times (dN_e/dt)$).

A calculation formula or map for associating the actual engine torque $TE_{ac}$ and the actual inertia torque $TI_{ac}$ with the actual torque $T_{ac}$ are previously stored in the storage module 12, and the actual torque calculation module 78 calculates the actual torque $T_{ac}$ from the actual engine torque $TE_{ac}$ and the actual inertia torque $TI_{ac}$ with reference to the calculation formula or the like. For example, the actual torque calculation module 78 subtracts the actual inertia torque $TI_{ac}$ from the actual engine torque $TE_{ac}$ and sets the resulting value as the actual torque $T_{ac}$ ($T_{ac}$=TE−TI). The above technique is an example of the procedure to calculate the actual torque.

The target torque setting module 79 includes an engine torque estimation module 79a for estimating the post-completion engine torque $TE_{fin}$ and an inertia torque estimation module 79b for estimating the post-completion inertia torque $TI_{fin}$.

The procedure that the engine torque estimation module 79a performs is generally the same as the one that the engine torque estimation module 73a does. That is, the engine torque estimation module 79a estimates the post-completion engine rotational speed $N_{efin}$ based on an operating condition of the vehicle (such as the vehicle speed V) during the restoration control operation. Then, the engine torque estimation module 79a sets the engine torque corresponding to the throttle operation amount $S_{ope}$ during the restoration control operation and the post-completion engine rotational speed $N_{efin}$ as the engine torque $TE_{fin}$ with reference to the above engine torque map or the like.

The procedure performed by the engine torque estimation module 79a is not limited to the procedure described above. The post-completion engine rotational speed $N_{efin}$ also depends on the engine rotational speed $N_e$ and the clutch rotational speed difference $N_{diff}$ during the restoration control operation. Thus, the engine torque estimation module 79a may estimate the post-completion engine rotational speed $N_{efin}$ based on the engine rotational speed $N_e$ and the clutch rotational speed difference $N_{diff}$ during the restoration control operation instead of the vehicle speed V. For example, the engine torque estimation module 79a may subtract a value obtained by multiplying the clutch rotational speed difference $N_{diff}$ by the reduction ratio $R_p$ of the primary speed reduction mechanism 36 from the engine rotational speed $N_e$ and set the resulting value as the post-completion engine rotational speed $N_{efin}$ ($N_{efin}$=$N_e$−$N_{diff}$×$R_p$).

The procedure that the inertia torque estimation module 79b performs is generally the same as the one the inertia torque estimation module 73b described above does. That is, the inertia torque estimation module 79b estimates the engine rotational acceleration $dN_{efin}/dt$ during the restoration of the clutch 40 to the engaged state based on an operating condition of the vehicle immediately after the start of a control operation at gear change (for example, a few hundred milliseconds after the clutch 40 starts to be shifted to the intermediate state) or during the restoration control operation. For example, the inertia torque estimation module 79b calculates the vehicle acceleration $dV/dt$ or the rotational acceleration $dN_{low}/dt$ of the driven-side friction member 42 immediately after the start of a control operation at gear change. Then, the inertia torque estimation module 79b multiplies the acceleration by the reduction ratio between each speed reduction mechanism placed in the torque transmission path (for example, the reduction ratio $R_{newgear}$ of the gear step newly set by the gear change command), and sets the resulting value as the engine rotational acceleration $dN_{efin}/dt$ during the restoration of the clutch 40 to the engaged state. Then, the inertia torque estimation module 79b sets a value obtained by multiplying the engine rotational acceleration $dN_{efin}/dt$ by the inertia moment I of the mechanism on the upstream side as the post-completion inertia torque $TI_{fin}$.

The target torque setting module 79 calculates the torque estimated to be transmitted via the clutch 40 after the restoration of the clutch 40 to the engaged state (that is, post-completion torque $T_{fin}$) based on the post-completion inertia torque $TI_{fin}$ and the post-completion engine torque $TE_{fin}$ obtained by the above procedures like the required torque acquisition module 73 described above. For example, the target torque setting module 79 subtracts the post-completion inertia torque $TI_{fin}$ from the post-completion engine torque $TE_{fin}$, and sets the resulting value as the post-completion torque $T_{fin}$ ($T_{fin}$=$TE_{fin}$−$TI_{fin}$). The target torque setting module 79 sets the post-completion torque $T_{fin}$ as the target torque $T_{tg}$.

The target torque setting module 79 may, as with the actual torque calculation module 78, perform the above procedure at predetermined intervals and update the target torque $T_{tg}$ as needed, or may perform the above procedure only immediately after the new-gear-step movable gear and the new-gear-step stationary gear are engaged with each other.

The clutch restoration control module 77 calculates the difference between the actual torque $T_{ac}$ and the target torque $T_{tg}$ (which is hereinafter referred to as "torque difference $\Delta T$") at predetermined intervals, and actuates the clutch actuator 14 by an amount corresponding to the torque difference $\Delta T$ (which is hereinafter referred to as "clutch command amount $C_{act}$"). The clutch position $P_c$ is thereby changed by an amount corresponding to the clutch command amount $C_{act}$.

Figure 9:
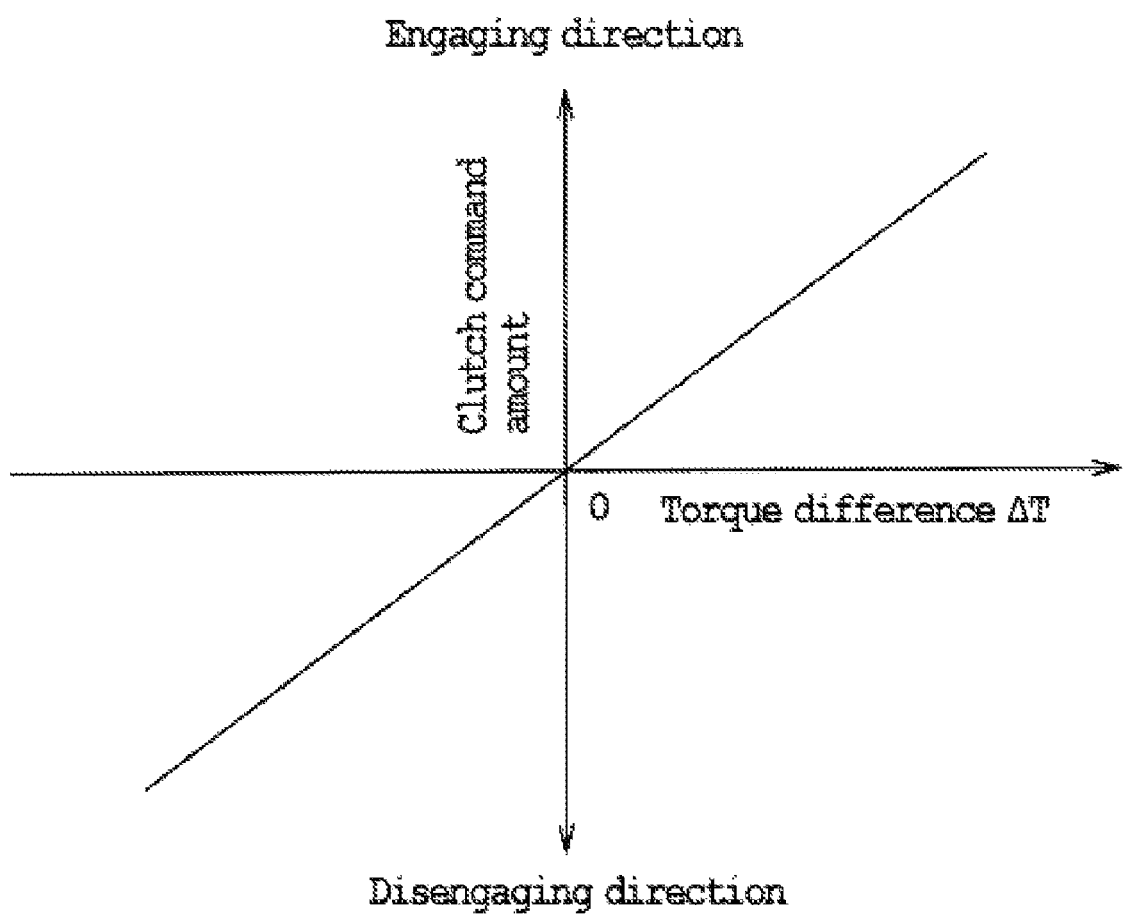
FIG. 9 is a graph for use in explaining an example of a map for associating the torque difference, which is the difference between actual torque and target torque, with the clutch command amount.

The control operation of the clutch restoration control module 77 may be executed, for example, as follows. A map (which is hereinafter referred to as "command amount map") or calculation formula for associating the torque difference $\Delta T$ with the clutch command amount $C_{act}$ is previously stored in the storage module 12. FIG. 9 is a graph for use in explaining an example of the command amount map. In the drawing, the vertical axis represents the clutch command amount $C_{act}$, and the horizontal axis represents the torque difference $\Delta T$ ($\Delta T$=$T_{tg}$−$T_{ac}$). As shown in the drawing, in the command amount map, the clutch command amount $C_{act}$ increases as the torque difference $\Delta T$ increases. Also, the clutch command amount $C_{act}$ is set such that the clutch actuator 14 is actuated in a direction to move the clutch position $P_c$ closer to the engaged position when the torque difference $\Delta T$ has a positive value, and such that the clutch actuator 14 is actuated in a direction to move the clutch position $P_c$ closer to the disengaged position when the torque difference $\Delta T$ has a negative value.

When the driven-side rotational speed $N_{low}$ is lower than the driving-side rotational speed $N_{up}$, such as at the time of upshifting, the clutch actuator 14 is actuated so as to eliminate the torque difference $\Delta T$ with reference to such a command amount map. For example, when the actual torque $T_{ac}$ has not reached the target torque $T_{tg}$ (i.e. when $\Delta T$>0) as shown in FIG. 8, the clutch position $P_c$ is moved closer to the engaged position by an amount corresponding to the torque difference $\Delta T$, thereby increasing the actual torque $T_{ac}$. That is, the driving-side rotational speed $N_{up}$ decreases and therefore approaches the driven-side rotational speed $N_{low}$, and the engine rotational speed $N_e$ also decreases accordingly. When the engine rotational speed $N_e$ is decreasing, the actual inertia torque $TI_{ac}$ corresponding to the rate of decrease, in addition to the actual engine torque $TE_{ac}$, is transmitted to the downstream side from the clutch 40. Also, in general, as an output characteristic of an engine, the engine torque also increases when the engine rotational speed decreases. Thus, when the clutch position $P_c$ is moved closer to the engaged position by an amount corresponding to the torque difference $\Delta T$, the actual torque $T_{ac}$ increases and therefore approaches the target torque $T_{tg}$. It should be noted that the command amount map is not limited to the map shown in FIG. 9 and may be changed depending on the output characteristics of the clutch actuator 14 and the like.

The clutch restoration control module 77 determines whether or not the clutch rotational speed difference $N_{diff}$ has fallen below the gear change-completion determination value Nth described above during the restoration control operation. When the restoration control operation is executed, the clutch rotational speed difference $N_{diff}$ is gradually eliminated as described above. The clutch restoration control module 77 terminates control of the clutch 40 executed based on the actual torque $T_{ac}$ and the target torque $T_{tg}$ described above when the clutch rotational speed difference $N_{diff}$ falls below the gear change-completion determination value Nth, and fully engages the clutch 40 to restore the clutch 40 to the engaged state. The above procedure is the procedure that the clutch restoration control module 77 performs.

When the clutch restoration control module 77 executes the control operation based on the actual torque $T_{ac}$ and the target torque $T_{tg}$, the required torque acquisition module 73 described above may set the torque lower than the post-completion torque $T_{fin}$ by a preset value as the required torque $T_{req}$. Then, it is possible to prevent torque lower than the required torque $T_{req}$ from being set as the target torque $T_{tg}$ after the clutch restoration control module 77 starts the control operation. As a result, it is possible to prevent the clutch position $P_c$ of the clutch 40 set in an intermediate state by the clutch shift control module 74 from being moved to the disengaged side after the restoration control operation is started.

The control operation of the clutch restoration control module 77 is not limited to the control operation based on the actual torque $T_{ac}$ and target torque $T_{tg}$ described above. For example, the clutch restoration control module 77 may actuate the clutch actuator 14 by an amount corresponding to the clutch rotational speed difference $N_{diff}$ to shift the clutch 40 to the engaged state gradually.

Figure 10:
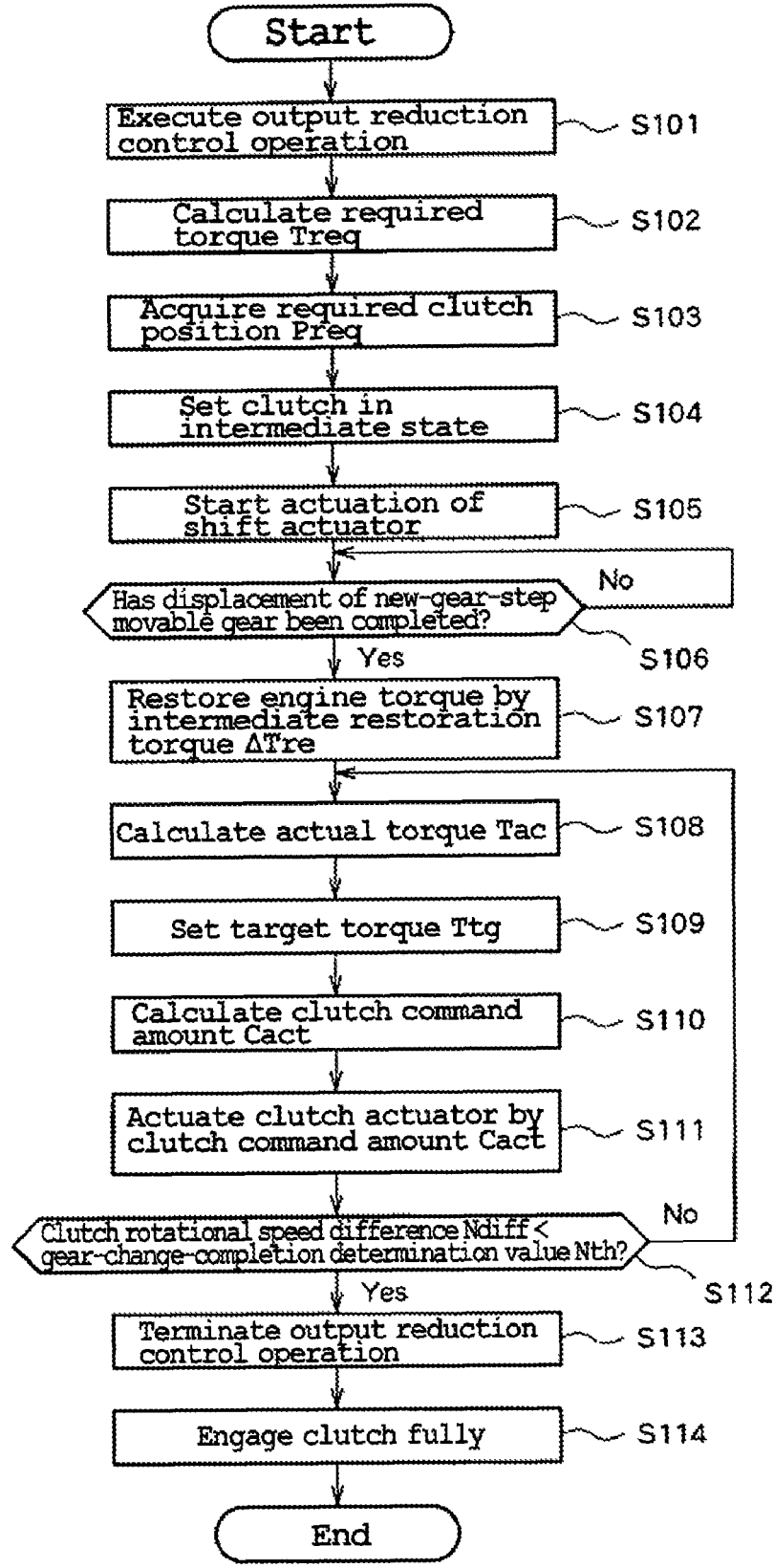
FIG. 10 is a flowchart of an example of the procedure that the control module performs at the time of upshifting.

The procedure that the controller 70 performs at the time of gear change is described next. FIG. 10 is a flowchart of an example of the procedure that the controller 70 performs. Here, the description refers to the procedure undertaken in upshifting as an example.

When the shift-up switch 9a is turned on and a gear change command is inputted into the controller 70, the engine control module 72 first executes the output reduction control operation to reduce the output torque of the engine 30 (step S101). The required torque acquisition module 73 calculates the required torque $T_{req}$ based on an operating condition of the vehicle (such as the throttle operation amount $S_{ope}$, the vehicle speed V, the engine rotational speed $N_e$, and the like in the above description) (step S102). The clutch shift control module 74 acquires the required clutch position $P_{req}$ corresponding to the required torque $T_{req}$ with reference to the clutch position map described above (step S103). The clutch shift control module 74 actuates the clutch actuator 14 a predetermined time period $\Delta t_1$ after the input of the gear change command and sets the clutch 40 in an intermediate state in which the clutch position $P_c$ is the same as the required clutch position $P_{req}$ (step S104). The gear switching control module 75 actuates the shift actuator 16 a predetermined time period $\Delta t_2$ after the input of the gear change command to start the displacement of the new-gear-step movable gear (step S105). The predetermined time periods $\Delta t_1$ and $\Delta t_2$ are set such that the clutch 40 is set in the intermediate state before the displacement of the new-gear-step movable gear is completed.

The gear displacement determination module 76 determines whether or not the new-gear-step movable gear and new-gear-step stationary gear have been engaged with each other, that is, whether the displacement of the new-gear-step movable gear has been completed based on a signal outputted from the gear position sensor 21 (step S106). The gear displacement determination module 76 repeats the procedure of step S106 until it detects the completion of the displacement of the new-gear-step movable gear.

When the gear displacement determination module 76 detects completion of the displacement of the new-gear-step movable gear, the engine control module 72 partially eases the execution of the above output reduction control operation to restore the engine torque by the intermediate restoration torque $\Delta T_{re}$ described above (step S107).

Also, when the gear displacement determination module 76 detects completion of the displacement of the new-gear-step movable gear, the clutch restoration control module 77 starts the restoration control operation. For example, as described above, the actual torque calculation module 78 calculates the actual torque $T_{ac}$ being transmitted from the clutch 40 to the downstream side based on an operating condition of the vehicle (step S108). Also, the target torque setting module 79 estimates the post-completion torque $T_{fin}$ based on the operating condition of the vehicle, and sets the post-completion torque $T_{fin}$ as the target torque $T_{tg}$ (step S109). Then, the clutch restoration control module 77 calculates the clutch command amount $C_{act}$ based on the torque difference $\Delta T$, which is the difference between the actual torque $T_{ac}$ and the target torque $T_{tg}$ (step S110), and actuates the clutch actuator 14 by the clutch command amount $C_{act}$ (step S111).

After that, the clutch restoration control module 77 determines whether or not the clutch rotational speed difference $N_{diff}$ has fallen below the preset gear change-completion determination value Nth (step S112). Here, if the clutch rotational speed difference $N_{diff}$ has not fallen below the gear change-completion determination value Nth, the clutch restoration control module 77 returns to step S108 and performs the subsequent steps again. The steps from S108 to S111 are repeated at predetermined time intervals (such as approximately ten milliseconds), and, consequently, the actual torque $T_{ac}$ tracks the target torque $T_{tg}$.

If the clutch rotational speed difference $N_{diff}$ is lower than the gear change-completion determination value Nth in step S112, the engine control module 72 terminates the output reduction control operation completely by, for example, restoring the ignition timing to that during normal running (step S113) to restore the output torque of the engine 30 to the level during normal running. The clutch restoration control module 77 then fully engages the clutch 40 (step S114).

As described above, the clutch shift control module 74 actuates the clutch actuator 14 in response to an input of a gear change command and shifts the clutch 40 to an intermediate state before the speed-change gears 53a, ..., 53f, 54a, 54f are selectively engaged by their dog clutches 51a and 51b. In the intermediate state, the driving-side friction member 41 and the driven-side friction member 42 are pressed against each other at a pressure lower than in the engaged state. Also, the clutch restoration control module 77 actuates the clutch actuator 14 to restore the clutch 40 set in the intermediate state to the engaged state after the speed-change gears 53a, ..., 53f, 54a, 54f are selectively engaged by their dog clutches 51a and 51.

Therefore, transmission of torque to the rear wheel 3 can be resumed when the new-gear-step movable gear and the new-gear-step stationary gear are engaged with each other by their dog clutches 51a and 51b, and the time during which transmission of torque to the rear wheel 3 is interrupted can be shortened and the acceleration performance at the time of gear change can be improved as compared to the case where the clutch 40 is once brought into the disengaged state. Also, since the pressure exerted between the driving-side friction member 41 and the driven-side friction member 42 in the intermediate state is lower than in the engaged state, it is possible to prevent engagement shock from occurring when the new-gear-step movable gear and the new-gear-step stationary gear are engaged with each other.

Also, the required torque acquisition module 73 calculates the required torque $T_{req}$ required to be transmitted from the clutch 40 to the rear wheel 3 side, and the clutch shift control module 74 sets the clutch 40 in an intermediate state which is determined based on the required torque $T_{req}$. Therefore, when the new-gear-step movable gear and the new-gear-step stationary gear are engaged with each other, torque equal to or close to the required torque $T_{req}$ can be transmitted to the rear wheel 3 and the required acceleration performance can be provided.

Also, the required torque acquisition module 73 estimates the post-completion torque $T_{fin}$ to be transmitted via the clutch 40 after the clutch 40 is restored to the engaged state, and acquires the required torque $T_{req}$ based on the estimated post-completion torque $T_{fin}$. Also, the required torque acquisition module 73 estimates the post-completion torque $T_{fin}$ to be transmitted via the clutch 40 after the clutch 40 is restored to the engaged state based on an operating condition of the vehicle before the shifting of the clutch 40 to the intermediate state is started. Therefore, torque corresponding to the torque estimated to be transmitted after the clutch 40 is restored to the engaged state can start to be transmitted to the rear wheel 3 when the new-gear-step movable gear and the new-gear-step stationary gear are engaged with each other.

Also, the clutch shift control module 74 sets the clutch 40 in an intermediate state which is determined based on an operating condition of the vehicle. More specifically, the intermediate state is determined based on the required torque $T_{req}$ that is acquired based on an operating condition of the vehicle, such as the throttle operation amount $S_{ope}$, the engine rotational speed $N_e$ or the vehicle speed V. Therefore, torque corresponding to the operating condition of the vehicle can be transmitted to the rear wheel 3 when the new-gear-step movable gear and the new-gear-step stationary gear are engaged with each other.

Also, as described above, the clutch shift control module 74 may set the clutch 40 in an intermediate state where the driving-side friction member 41 and the driven-side friction member 42 are pressed against each other at a pressure which does not cause relative rotation between the driving-side friction member 41 and the driven-side friction member 42 until the speed-change gears 53a, . . . , 53f, 54a, . . . , 54f are selectively engaged by their dog clutches 51a and 51b. In this case, it is possible to prevent the engine rotational speed $N_e$ from increasing rapidly before the speed-change gears 53a, . . . , 53f, 54a, 54f are engaged by their dog clutches 51a and 51b.

Also, the gear change control device 10 is provided with the shift actuator 16 for selectively and relatively displacing the speed-change gears 53a, . . . , 53f, 54a, . . . , 54f, and the gear switching control module 75 which actuates the shift actuator 16 in response to an input of a gear change command to start relative displacement of the speed-change gears 53a, . . . , 53f, 54a, . . . , 54f, and causes the speed-change gears 53a, . . . , 53f, 54a, . . . , 54f to be selectively engaged by their dog clutches 51a and 51b while the clutch 40 is set in the intermediate state. Therefore, a gear change can be accomplished without the need for operation of the transmission 50 by the rider. In addition, transmission of torque to the rear wheel 3 is resumed when the speed-change gear 53a, . . . , 53f, 54a, . . . , 54f are selectively engaged by the control operation of the gear switching control module 75.

Also, the gear change control device 10 is provided with the engine control module 72 for reducing the engine torque in response to input of a gear change command. Since the torque to the transmission 50 is reduced by such an engine control operation, the force required to release the engagement of the previous-gear-step gears can be reduced.

It should be noted that the present invention is not limited to the gear change control device 10 described above and may be modified in various ways.

Figure 11:
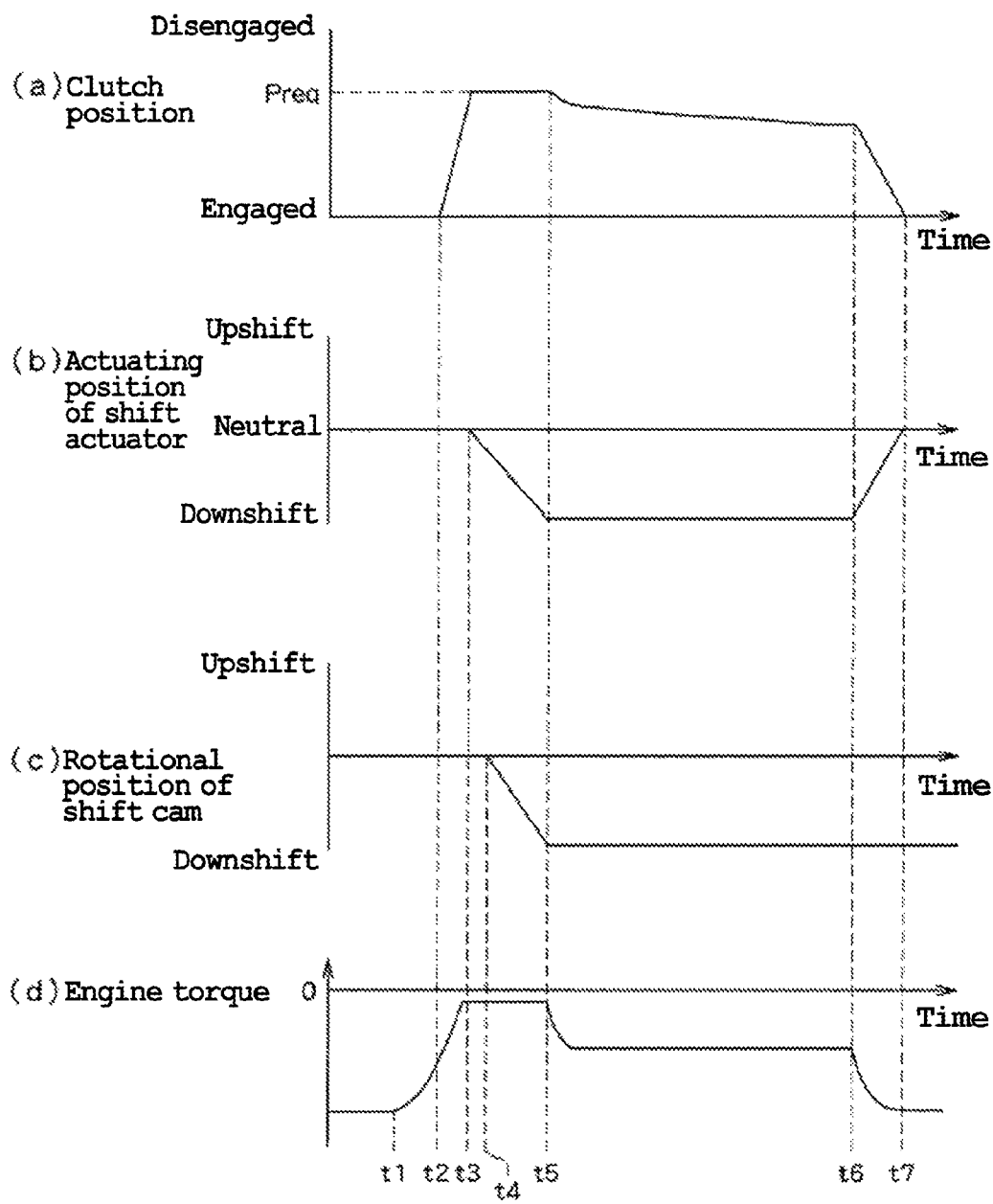
FIG. 11 is a time chart for use in explaining the control operation that the control module executes at the time of downshifting in which graph (a) shows the clutch position over time, graph (b) shows the actuating position of a shift actuator over time, and graph (d) shows the engine torque over time.

For example, while the above description is concerned with an upshifting example, the present invention may be applied to control procedure performed during downshifting. FIG. 11 is a time chart for use in explaining the control operation that the controller 70 executes at the time of downshifting. FIG. 11(a) shows the clutch position $P_c$ of the clutch 40 over time. FIG. 11(b) shows the actuating position of the shift actuator 16 over time. FIG. 11(c) shows the rotational position of the shift cam 56b over time. FIG. 11(d) shows the engine torque over time.

In downshifting, the throttle grip 5a is typically closed and therefore the throttle operation amount $S_{ope}$ has a small value. Thus, the engine torque before the input of a gear change command has a negative value as shown in FIG. 11(d). When a gear change command for a downshift is inputted at $t_1$, the engine control module 72 executes, contrary to the case of an upshift, an output increase control operation to increase the engine torque to adjust the engine torque to a preset value (for example, zero or a value slightly lower than zero). The engine control module 72 executes such an output increase control operation instead of the control operation of step S101 as shown in the flowchart of FIG. 10.

Also, as shown in FIG. 11(b), a predetermined time period $\Delta t_2$ after the input of the gear change command, the gear switching control module 75 starts actuation of the shift actuator 16 in the opposite direction from that at the time of upshifting ($t_3$). Therefore, the gear switching mechanism 56 is actuated as shown in FIG. 11(c), and the engagement of the previous-gear-step gears is released and displacement of the new-gear-step movable gear is started at $t_4$. Then, the new-gear-step movable gear is engaged with the new-gear-step stationary gear at $t_5$.

Also, as shown in FIG. 11(a), a predetermined time period $\Delta t_1$ after the input of the gear change command, the clutch shift control module 74 shifts the clutch 40, which has been set in the engaged state during the running until then, to the disengaged side ($t_2$) until the clutch 40 reaches an intermediate state where the driving-side friction member 41 and the driven-side friction member 42 are pressed against each other at a pressure lower than in the engaged state as in the case of upshifting. The required clutch position $P_{req}$ in this case is also determined based on the required torque $T_{req}$ as in the case of upshifting, and torque corresponding to the required torque $T_{req}$ is transmitted to the downstream side via the clutch 40 and the transmission 50 when the new-gear-step movable gear is engaged with the new-gear-step stationary gear.

When the gear displacement determination module 76 detects the completion of the displacement of the new-gear-step movable gear at $t_5$, the engine control module 72 terminates the output increase control operation in a stepwise fashion as shown in FIG. 11(d). The engine control module 72 reduces the engine torque by a preset torque instead of the procedure in step S107 as shown in the flowchart of FIG. 10.

Also, as shown in FIG. 11(a), when the completion of the displacement of the new-gear-step movable gear is detected at $t_5$, the clutch restoration control module 77 starts a restoration control operation to restore the clutch 40 gradually to the engaged state. In the restoration control operation, the clutch restoration control module 77 controls the clutch 40 based on, for example, the actual torque $T_{ac}$ and the target torque $T_{tg}$ as described above.

In the restoration control operation at the time of downshifting, the clutch command amount $C_{act}$ corresponding to the torque difference $\Delta T$ is calculated with reference, instead of the command amount map, to a map (which is hereinafter referred to as "downshift command amount map") in which the clutch command amount $C_{act}$ is set so as to move the clutch 40 to the engaged side when the actual torque $T_{ac}$ is higher than the target torque $T_{tg}$ (i.e. when $\Delta T<0$).

Figure 12:
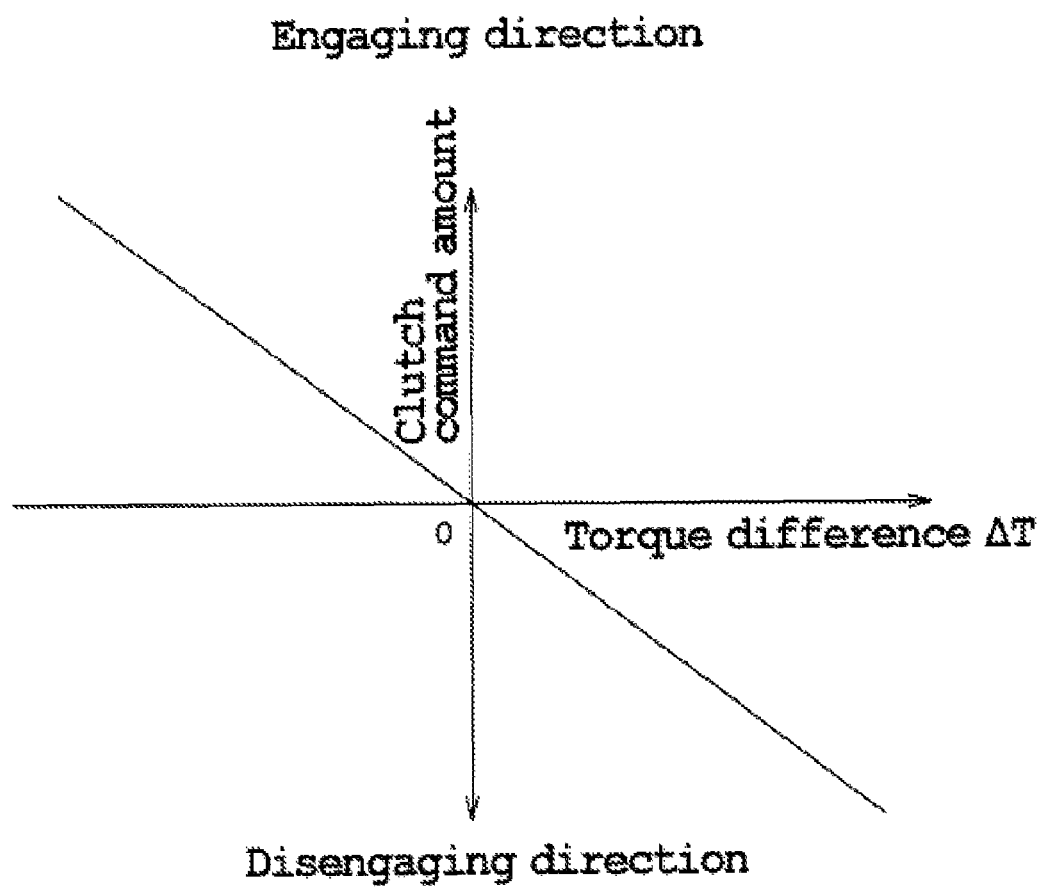
FIG. 12 is a graph for use in explaining another example of a map for associating the torque difference, which is the difference between actual torque and target torque, with the clutch command amount.

FIG. 12 is a graph showing an example of a downshift command amount map. In FIG. 12, the vertical axis represents the clutch command amount $C_{act}$, and the horizontal axis represents the torque difference $\Delta T$ ($\Delta T=T_{tg}-T_{ac}$). As shown in FIG. 12, in the downshift command amount map, the clutch command amount $C_{act}$ is set such that the clutch actuator 14 is actuated in a direction to move the clutch position $P_c$ closer to the disengaged position when the torque difference $\Delta T$ has a positive value. Also, the clutch command amount $C_{act}$ is set such that the clutch actuator 14 is actuated in a direction to move the clutch position $P_c$ closer to the engaged position when the torque difference $\Delta T$ has a negative value.

When the driven-side rotational speed $N_{low}$ is higher than the driving-side rotational speed $N_{up}$, such as at the time of downshifting, the clutch actuator 14 is actuated so as to eliminate the torque difference $\Delta T$ with reference to such a downshift command amount map. For example, when the actual torque $T_{ac}$ is higher than the target torque $T_{tg}$ (i.e. when $\Delta T<0$), the clutch position $P_c$ is moved, contrary to the case of upshifting, closer to the engaged position by an amount corresponding to the torque difference $\Delta T$. Then, the actual torque $T_{ac}$ decreases and therefore approaches the target torque $T_{tg}$. That is, the driving-side rotational speed $N_{up}$ increases and therefore approaches the driven-side rotational speed $N_{low}$, and the engine rotational speed $N_e$ also increases accordingly. When the engine rotational speed $N_e$ is increasing, the inertia torque TI corresponding to its rate of increase is reduced from the actual engine torque $TE_{ac}$, and the residual torque is transmitted from the clutch 40 to the downstream side. Also, in general, as an output characteristic of an engine, the engine torque decreases when the engine rotational speed increases. Thus, when the clutch position $P_c$ is moved closer to the engaged position by an amount corresponding to the torque difference $\Delta T$, the actual torque $T_{ac}$ decreases and therefore approaches the target torque $T_{tg}$.

After that, when the clutch rotational speed difference $N_{diff}$ falls below the gear change-completion determination value Nth at $t_6$, the clutch restoration control module 77 fully engages the clutch 40 to restore it to the engaged state. At this time, the engine control module 72 terminates the output increase control operation completely to reduce the engine torque to the level before the input of the gear change command. The above is an example of the control operation that the gear change control device 10 executes at the time of downshifting.

In the above description, the clutch restoration control module 77 controls the clutch 40 based on the actual torque $T_{ac}$ and the target torque $T_{tg}$ after the new-gear-step movable gear and the new-gear-step stationary gear are engaged with each other. However, the clutch restoration control module 77 may maintain the clutch position of the clutch 40 set in the intermediate state by the clutch shift control module 74 (that is, the required clutch position $P_{req}$) even after the new-gear-step movable gear and the new-gear-step stationary gear are engaged with each other and restore the clutch 40 to the engaged state when the clutch rotational speed difference $N_{diff}$ falls below the gear change-completion determination value Nth.

Also, in the above description, the clutch shift control module 74 determines the required clutch position $P_{req}$ based on the required torque $T_{req}$ which is calculated by the required torque acquisition module 73 based on an operating condition of the vehicle. However, the clutch shift control module 74 may calculate the required clutch position $P_{req}$ directly based on an operating condition of the vehicle. For example, a map or calculation formula for associating the throttle operation amount $S_{ope}$, the vehicle speed V or the engine rotational speed $N_e$ with the clutch position $P_c$ may be previously stored in the storage module 12. The clutch shift control module 74 may acquires the clutch position $P_c$ corresponding to the throttle operation amount $S_{ope}$ or the like before the start of a control operation at gear change with reference to the map or the like and set the clutch position $P_c$ as the required clutch position $P_{req}$.

Also, in the above description, the clutch 40 is operated by the clutch actuator 14 and the transmission 50 is also operated by the shift actuator 16. However, the transmission 50 may be operated by the rider while the clutch 40 is operated by the clutch actuator 14. In this configuration, the transmission 50 may be provided, for example, with a well-known shift pedal operable by the rider to rotate the shift cam 56b through a preset angle instead of the shift actuator 16. Also, the gear change control device 10 may be provided with a sensor attached to the shift pedal for detecting a pedal operation of the rider. The sensor inputs a gear change command into the controller 70 in response to pedal operation of the rider. Then, the clutch shift control module 74 sets the clutch 40 to the intermediate state described above in response to the input of the gear change command.

It is to be clearly understood that the above description was made only for purposes of an example and not as a limitation on the scope of the invention as claimed hereinbelow.

What is claimed:

1. A gear change control device for a vehicle including a drive wheel, a friction clutch including a driving-side friction member and a driven-side friction member which are pressed against each other in an engaged state and released from each other in a disengaged state, and a transmission including a plurality of gears including dog clutches in which the plurality of gears are selectively disengaged and engaged by the dog clutches at a time of gear change to transmit a torque to the drive wheel at a new transmission ratio, the gear change control device comprising:

a clutch actuator arranged to operate the friction clutch;

a clutch shift control module programmed to actuate the clutch actuator in response to a gear change command and to shift the friction clutch to an intermediate state between the engaged state and the disengaged state in which the driving-side friction member and the driven-side friction member are pressed against each other, before the plurality of gears are selectively engaged by the dog clutches, at a pressure lower than a pressure in the engaged state but sufficient to transmit a reduced torque, compared to the engaged state, to the drive wheel; and a clutch restoration control module programmed to actuate the clutch actuator to restore the friction clutch from the intermediate state to the engaged state after the plurality of gears are selectively engaged by the dog clutches; wherein the intermediate state is a maximum disengaged state of the friction clutch during the time of gear change.

2. The gear change control device of claim 1, wherein the torque to the drive wheel is interrupted during the time of gear change only when the plurality of gears are disengaged.

3. The gear change control device of claim 1, wherein the friction clutch is not set in the disengaged state during the time of gear change in which the plurality of gears are selectively disengaged and engaged by the dog clutches.

4. The gear change control device of claim 1, wherein the clutch actuator is arranged to hold the friction clutch in the intermediate state during the time of gear change in which the plurality of gears are selectively disengaged and engaged by the dog clutches.

5. The gear change control device according to claim 1, further comprising a required torque acquisition module programmed to acquire a required torque to be transmitted from the friction clutch to the drive wheel, wherein the clutch shift control module sets the friction clutch in the intermediate state based on the required torque.

6. The gear change control device according to claim 5, wherein the required torque acquisition module is programmed to estimate the required torque to be transmitted via the friction clutch after the friction clutch is restored to the engaged state and to determine the required torque based on an estimated torque.

7. The gear change control device according to claim 6, wherein the required torque acquisition module estimates the required torque to be transmitted via the friction clutch after the friction clutch is restored to the engaged state based on an operating condition of the vehicle before the shift of the friction clutch to the intermediate state is started.

8. The gear change control device according to claim 5, wherein the clutch shift control module sets the friction clutch in the intermediate state based on an operating condition of the vehicle.

9. The gear change control device according to claim 8, further comprising a sensor arranged to detect a throttle operation of a rider on the vehicle, wherein the clutch shift control module sets the friction clutch in the intermediate state based on the throttle operation detected by the sensor.

10. The gear change control device according to claim 8, further comprising a sensor arranged to detect an engine rotational speed, wherein the clutch shift control module sets the friction clutch in the intermediate state based on the engine rotational speed detected by the sensor.

11. The gear change control device according to claim 8, further comprising a sensor arranged to detect a vehicle speed, wherein the clutch shift control module sets the friction clutch in the intermediate state based on the vehicle speed detected by the sensor.

12. The gear change control device according to claim 1, wherein the clutch shift control module sets the friction clutch in the intermediate state such that there is no relative rotation between the driving-side friction member and the driven-side friction member until the plurality of gears are selectively engaged by the dog clutches.

13. The gear change control device according to claim 1, further comprising:

a shift actuator arranged to selectively displace the plurality of gears; and a gear switching control module programmed to actuate the shift actuator to start displacing the plurality of gears in response to the gear change command, and to cause the plurality of gears to be selectively engaged by the dog clutches while the friction clutch is in the intermediate state.

14. The gear change control device according to claim 1, further comprising an engine control module programmed to reduce the torque of an engine of the vehicle in response to the gear change command.

15. A straddle-type vehicle comprising:

the gear change control device according to claim 1.

16. A gear change control method for a vehicle, the vehicle including a drive wheel, a friction clutch including a driving-side friction member and a driven-side friction member which are pressed against each other in an engaged state to transmit a torque to the drive wheel, a clutch actuator arranged to operate the friction clutch, and a transmission including a plurality of gears each including a dog clutch and in which the plurality of gears are selectively disengaged and engaged by the dog clutches at a time of gear change to transmit the torque to the drive wheel at a new transmission ratio, the gear change control method comprising:

a step of actuating the clutch actuator in response to a gear change command to set the friction clutch in an intermediate state in which the driving-side friction member and the driven-side friction member are pressed against each other at a pressure lower than a pressure in the engaged state before the plurality of gears are selectively engaged by the dog clutches but sufficient to transmit a reduced torque, compared to the engaged state, to the drive wheel; and a step of actuating the clutch actuator to restore the friction clutch from the intermediate state to the engaged state after the plurality of gears are selectively engaged by the dog clutches; wherein the intermediate state is a maximum disengaged state of the friction clutch during the time of gear change.

17. A gear change control device for a vehicle including a drive wheel, the gear change control device comprising:

a plurality of sensors;

an electronic control unit programmed to receive inputs from the plurality of sensors; and a clutch actuator arranged to receive control signals from the electronic control unit and to operate a friction clutch, the friction clutch including a driving-side friction member and a driven-side friction member which are pressed together in an engaged state to transmit a torque to the drive wheel; wherein the clutch actuator is actuated in response to a gear change command to shift the friction clutch to an intermediate state during a time of gear change in which the driving-side friction member and the driven-side friction member are pressed together at a pressure lower than a pressure in the engaged state but sufficient to transmit a reduced torque, compared to the engaged state, to the drive wheel before a plurality of speed-change gears are selectively engaged to transmit the torque to the drive wheel at a new transmission ratio; and the intermediate state is a maximum disengaged state of the friction clutch during the time of gear change.

18. The gear change control device of claim 17, further comprising a shift actuator arranged to receive control signals from the electronic control unit and to actuate a gear switching mechanism to selectively displace the plurality of speed-change gears in an axial direction.

19. The gear change control device of claim 18, wherein the electronic control unit includes a storage module, a clutch actuator drive circuit, a shift actuator drive circuit, an engine drive circuit, and a controller operatively coupled between the plurality of sensors and the storage module, the clutch actuator drive circuit, the shift actuator drive circuit, and the engine drive circuit.

20. The gear change control device of claim 19, wherein the controller is programmed to execute a control operation to reduce the torque of a vehicle engine in response to the gear change command.

21. The gear change control device of claim 17, wherein the plurality of sensors includes a sensor arranged to detect a throttle operation by a vehicle rider.

22. The gear change control device of claim 21, wherein the plurality of sensors further includes a sensor arranged to detect a rotational speed of a vehicle engine, a sensor arranged to detect a gear position, and a sensor arranged to detect a clutch position.

23. The gear change control device of claim 19, wherein, when the gear change command is inputted into the controller from a gear shift-up switch, the controller is programmed to start a control operation to reduce the torque of a vehicle engine to a preset torque or by a reduced amount.

24. The gear change control device of claim 23, wherein the controller is programmed to actuate the shift actuator in a shift-up direction from a neutral position in response to the gear change command.

25. The gear change control device of claim 23, wherein the controller is programmed to shift the friction clutch to the intermediate state.

26. The gear change control device of claim 25, wherein the controller is programmed to start a control operation to restore the friction clutch from the intermediate state to the engaged state after the plurality of speed-change gears are selectively engaged.

27. The gear change control device of claim 26, wherein the controller is programmed to estimate the torque to be transmitted via the friction clutch after the friction clutch is restored to the engaged state based on an operating condition of the vehicle before the time of gear change.

28. The gear change control device of claim 26, wherein the controller is programmed to restore the torque in a stepwise manner after the plurality of speed-change gears are selectively engaged.

* * * * *